(12) United States Patent
Anderson

(10) Patent No.: US 9,651,379 B2
(45) Date of Patent: May 16, 2017

(54) ELIMINATING RING LASER GYRO BACKSCATTER

(71) Applicant: Honeywell International Inc., Morristown, NJ (US)

(72) Inventor: Carl David Anderson, Prior Lake, MN (US)

(73) Assignee: Honeywell International Inc., Morris Plains, NJ (US)

( * ) Notice: Subject to any disclaimer, the term of this patent is extended or adjusted under 35 U.S.C. 154(b) by 67 days.

(21) Appl. No.: 14/542,734

(22) Filed: Nov. 17, 2014

(65) Prior Publication Data

US 2016/0138922 A1 May 19, 2016

(51) Int. Cl.
| | | |
|---|---|---|
| G01C 19/68 | (2006.01) | |
| G01C 19/64 | (2006.01) | |
| G01C 19/66 | (2006.01) | |
| G01C 19/70 | (2006.01) | |

(52) U.S. Cl.
CPC ............. *G01C 19/68* (2013.01); *G01C 19/64* (2013.01); *G01C 19/661* (2013.01); *G01C 19/665* (2013.01); *G01C 19/70* (2013.01)

(58) Field of Classification Search
CPC ...... G01C 19/68; G01C 19/70; G01C 19/661; G01C 19/66; G01C 19/665; H01S 3/083
USPC ................................................ 356/472, 473
See application file for complete search history.

(56) References Cited

U.S. PATENT DOCUMENTS

| | | |
|---|---|---|
| 4,113,387 A | 9/1978 | Shutt |
| 4,152,071 A | 5/1979 | Podgorski |
| 4,386,853 A | 6/1983 | Ljung |
| 4,410,274 A | 10/1983 | Ljung |
| 4,410,276 A | 10/1983 | Ljung et al. |
| 4,526,469 A | 7/1985 | Egli et al. |
| 4,686,683 A | 8/1987 | Martin |
| 4,740,085 A | 4/1988 | Lim |

(Continued)

FOREIGN PATENT DOCUMENTS

| | | |
|---|---|---|
| CA | 1339667 | 2/1998 |
| EP | 2413099 | 2/2012 |
| FR | 2611039 | 8/1988 |

OTHER PUBLICATIONS

Faucheux et al., "The Ring Laser Gyro", Apr. 6, 1988, pp. 101-1115, vol. 19, No. 3, Published in: FR.

(Continued)

*Primary Examiner* — Kara E Geisel
*Assistant Examiner* — Jonathon Cook
(74) *Attorney, Agent, or Firm* — Foggs & Powers LLC

(57) ABSTRACT

A ring laser gyroscope (RLG) block is provided. The RLG block includes a first corner bordered by a first portion of a first side and a first portion of a third side; a second corner bordered by a first portion of a second side and a second portion of the third side; and a third corner bordered by a second portion of the second side and a second portion of the first side. The first portion of the first side shifts the first corner laterally in a lasing plane of the RLG block, toward the second corner, and perpendicular to a first normal of a first mirror when a temperature change contracts the RLG block; and shifts the first corner laterally away from the second corner, and perpendicular to the first normal when the temperature change causes an expansion of the ring laser gyroscope block.

20 Claims, 21 Drawing Sheets

(56) References Cited

U.S. PATENT DOCUMENTS

| | | | |
|---|---|---|---|
| 4,844,615 A | | 7/1989 | Benoist |
| 4,847,855 A | * | 7/1989 | Derry .................... G01C 19/70 |
| | | | 356/476 |
| 4,884,283 A | | 11/1989 | Rahn et al. |
| RE34,121 E | * | 11/1992 | Benoist ................ G01C 19/70 |
| | | | 356/459 |
| 5,359,413 A | | 10/1994 | Chang et al. |
| 5,442,442 A | | 8/1995 | Kanegsberg et al. |
| 5,606,416 A | * | 2/1997 | Son ........................ G01C 19/68 |
| | | | 356/473 |
| 7,327,461 B2 | | 2/2008 | Lignon |
| 7,916,302 B2 | | 3/2011 | Fellows et al. |
| 2006/0176489 A1 | | 8/2006 | Molaskey et al. |
| 2010/0014092 A1 | | 1/2010 | Fellows et al. |

OTHER PUBLICATIONS

European Patent Office, "Extended European Search Report from EP application No. 15193768.7 mailed Mar. 7, 2016", "from foreign counterpart of U.S. Appl. No. 14/542,734", Mar. 7, 2016, pp. 1-10, Published in: EP.

* cited by examiner

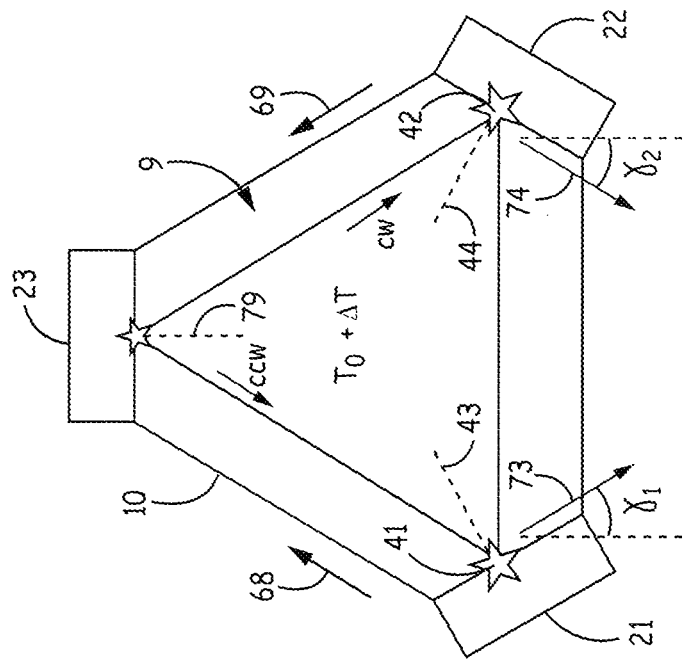
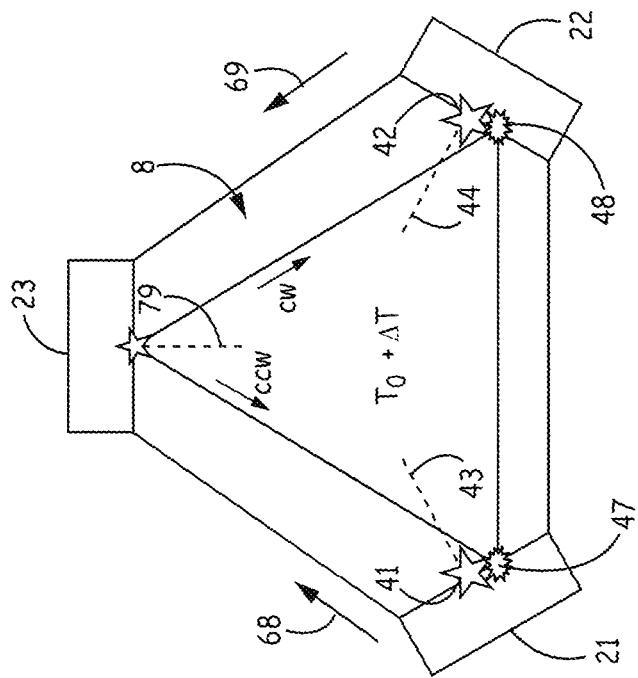
FIG. 7B
FIG. 7A
PRIOR ART

1400

| prepare the ring laser gyroscope block so a first corner and/or second corner of at least three corners of the ring laser gyroscope block is operable to shift laterally in a lasing plane of the ring laser gyroscope block and perpendicular to a normal of the respective mirror associated with the first corner and/or second corner | 1402 |

- 1502: attach at least one first electrically-controlled elements on a first portion of a first side of the ring laser gyroscope block

- 1504: arrange a feedback circuit to apply a first electrical signal to the at least one first electrically-controlled element attached to the first portion of the first side

- 1506: determine the temperature change exceeds a preselected-temperature-change threshold

- 1508: send the first electrical signal to the at least one first electrically-controlled element responsive to the detected change in temperature

FIG. 15

ELIMINATING RING LASER GYRO BACKSCATTER

BACKGROUND

In a ring laser gyroscope (RLG), laser light beams counter-propagate about a closed path. Typically, a path length control loop adjusts the optical path length in the RLG block to maximize the laser output power output from the ring laser gyroscope. When the RLG is at rest in inertial space, the two beams oscillate at the same or substantially the same frequency. If the system rotates in inertial space, the counter-propagating optical laser beams oscillate at different frequencies. The frequency difference is an indication of the rate of rotation.

For small rotation rates of the RLG, optical power backscattering from the laser mirrors causes the counter-propagating optical laser beams to resonate together and "lock-in". Lock-in degrades the accuracy of a RLG. During lock-in, the RLG is unable to sense rotation. To minimize the lock-in effect, the RLG is dithered (periodically rotated) so that the RLG is in constant motion, rotating periodically, through a zero input rate. Thus, dithering minimizes the time that lock-in can occur. As the dither rotation slows down and approaches the dither turn-around points, the laser beams interact, due to of the RLG block 411 causes an expansion of the RLG block 411.ns of each single beam.

RLGs with large amounts of back scatter exhibit high angular random walk (ARW) and poor gyroscope performance.

SUMMARY

The present application relates to a ring laser gyroscope block. The ring laser gyroscope block includes a first corner bordered by a first portion of a first side of the ring laser gyroscope block and a first portion of a third side of the ring laser gyroscope block. The ring laser gyroscope block also includes a second corner bordered by a first portion of a second side of the ring laser gyroscope block and a second portion of the third side of the ring laser gyroscope block. The ring laser gyroscope block also includes a third corner bordered by a second portion of the second side and a second portion of the first side. The first portion of the first side shifts the first corner laterally in a lasing plane of the ring laser gyroscope block, in the direction toward the second corner, and perpendicular to a first normal of a first mirror associated with the first corner when a temperature change of the ring laser gyroscope block causes a contraction of the ring laser gyroscope block. The first portion of the first side shifts the first corner laterally in the lasing plane, in the direction away from the second corner, and perpendicular to the first normal when the temperature change of the ring laser gyroscope block causes an expansion of the ring laser gyroscope block.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 7A shows the prior art RLG cavity in the RLG block similar to that shown in FIG. 5 after the RLG block experiences a contraction due to a temperature change;

FIG. 7B shows the RLG cavity of the RLG block of FIG. 5 after the first mirror and the second mirror have been laterally shifted toward each other responsive to the contraction due to the temperature change of the RLG block in accordance with the present application;

FIG. 14 shows a method to prevent lock-in due to temperature changes of RLG block in a RLG in accordance with the present application; and FIG. 15 shows a method to prevent lock-in due to temperature changes of an actively-configured RLG block in a RLG in accordance with the present application.

Figure 1:
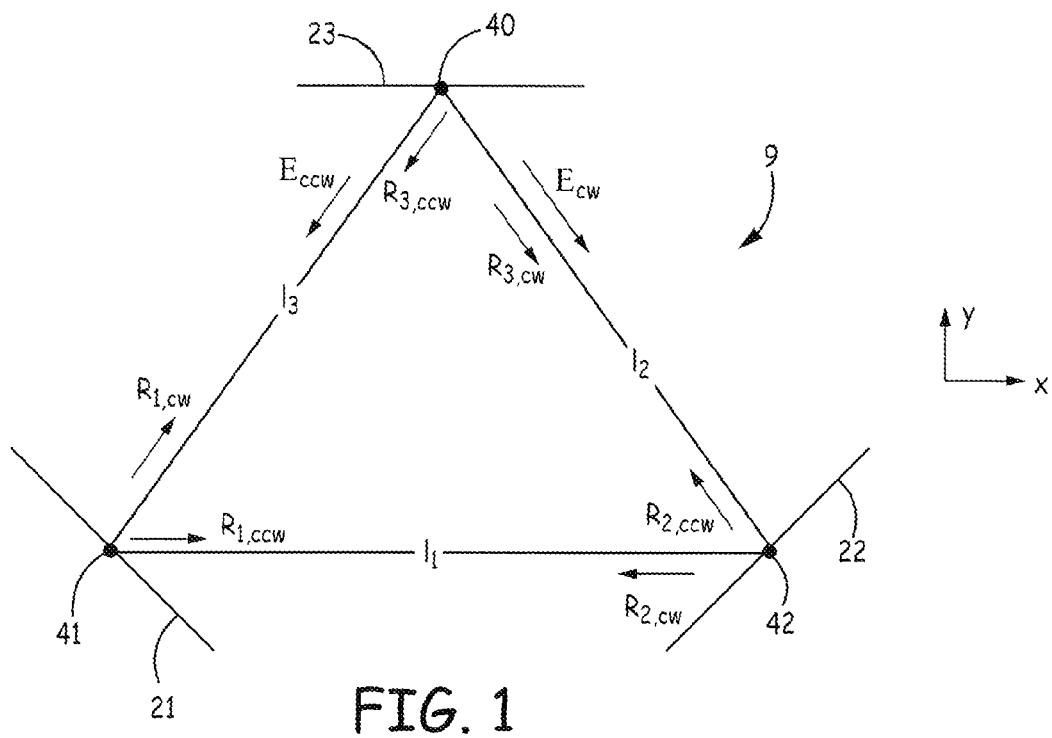
FIG. 1 shows a three mirror ring laser gyroscope (RLG) cavity that supports counter-propagating waves.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The systems and methods described below resolve the problem of lock-in by minimizing (and in most cases eliminating) the combined mirror backscatter of the RLG. This is accomplished by micro-positioning one of the mirror(s) laterally, along the in-plane direction of the RLG, to alter its phase. Also, backscatter phase changes, due to block thermal expansion, are effectively removed.

The backscatter that causes lock-in of counter-propagating optical beams in a RLG is due to optical scattering from scattering sites on the mirrors. All mirrors have scattering sites. These may be caused by micro abrasions or particles located on the mirror surfaces. Each scattering site has an amplitude and phase associated with its contribution of backscatter. Since the counter-propagating optical laser beams are coherent, all of the individual scatter sites on a mirror can be summed together, allowing each mirror to be characterized as having one backscatter amplitude and phase. The combined backscatter effect is the vector sum of the backscatter amplitudes and phases of all the mirrors at the corners of the RLG block.

The U.S. Pat. No. 4,152,071 entitled CONTROL APPARATUS by Theodore J. Podgorski and issued on May 1, 1979 describes a technique to reduce backscatter by positioning transducer mirrors (e.g., two of three mirrors in a triangular block) in a push-pull manner. As a first transducer mirror is moved inward, a second transducer mirror is moved outward by the same amount, in order to minimize (and potentially cancel) the amplitude and phase of the combined backscattered light from all the mirrors while maintaining the optical path length in the RLG block to maximize the laser output power output from the RLG. Thus, this positioning control of the transducer mirrors, which is referred to herein as "random drift improvement" or RDI, simultaneously minimizes lock-in and maintains the path length of the counter-propagating optical laser beams CCW and CW in the RLG block. The push-pull phasing between the two transducer mirrors is initially set during the device assembly, which may not be ideal and cannot be predicted.

However, the phase of the scattered light from the two transducer mirrors is not controlled by this random drift improvement technique when block experiences thermal expansion or contraction. Specifically, when the gyroscope block experiences thermal expansion or contraction due to temperature changes, the counter-propagating optical laser beams are incident on different spots on the two transducer mirrors. As is well known in the art, an optical beam incident on a first spot of a mirror has different phase scattering than an optical beam incident on a second spot of the same mirror. The thermal expansion or contraction of a RLG block, to which the mirrors are attached, causes the spot, where the counter-propagating optical laser beams are incident, to be shifted laterally. This causes a change in phase between the two transducer mirrors and degrades the performance of the RLG.

In many materials, a temperature increase always causes an expansion of the material and a temperature decrease always causes a contraction of the material. However, some materials are designed to minimize the relative change in length over relatively large temperature range (e.g., ZERO-DUR®). In some cases, at a particular temperature, these specially designed materials may experience an expansion with a temperature decrease and a contraction with a temperature increase.

FIG. 1 shows a three mirror RLG cavity 9 that supports counter-propagating waves. The clockwise (CW) wave is indicated by the vector $E_{CW}$ and the counter-clockwise (CCW) wave is indicated by the vector $E_{CCW}$. The terms "CW wave $E_{CW}$" and "optical beam CW" are used interchangeably herein. Likewise, the terms "CCW wave $E_{CCW}$" and "optical beam CCW" are used interchangeably herein.

The RLG cavity 9 is formed by the three mirrors 21-23 that support the propagation of the counter-propagating waves $E_{CCW}$ and $E_{CW}$ in a lasing plane that is shown in FIG. 1 as the X-Y plane. The X-Y plane in which the counter-propagating optical laser beams are propagating is referred to herein as the "lasing plane" or "in plane".

A first-incidence-spot 41 of a first mirror 21 is defined herein to be that spot of the first mirror 21 on which the counter-propagating optical waves $E_{CCW}$ and $E_{CW}$ in the lasing plane X-Y of the RLG cavity 9 are incident. A second-incidence-spot 42 of a second mirror 22 is defined herein to be that spot of the second mirror 22 on which the counter-propagating optical waves $E_{CCW}$ and $E_{CW}$ in the lasing plane X-Y of the RLG cavity 9 are incident. A third-incidence-spot 40 of a third mirror 23 is defined herein to be that spot of the third mirror 23 on which the counter-propagating optical waves $E_{CCW}$ and $E_{CW}$ in the lasing plane X-Y of the RLG cavity 9 are incident.

The first mirror 21 has a first-incidence-spot 41, the second mirror 22 has a second-incidence-spot 42, and the third mirror 23 has a third-incidence-spot 40. The distance between the first-incidence-spot 41 and the second-incidence-spot 42 is indicated as length 11. The distance between the second-incidence-spot 42 and the third-incidence-spot 40 is indicated as length 12. The distance between the third-incidence-spot 40 and the first-incidence-spot 41 is indicated as length 13.

The backscattered wave amplitude and phase parameters (noted herein r and $\epsilon$) are dependent upon the mirror scattering coefficient, which affects the amplitude r and the relative position of the mirrors in the RLG cavity 9 which affects the phase of the scattered light. The CW wave ($E_{CW}$) is scattered from the first mirror 21 as CCW coherent backscattered waves represented generally at $R_{1,CCW}$. The CW wave ($E_{CW}$) is scattered from the second mirror 22 as CCW coherent backscattered waves represented generally at $R_{2,CCW}$. The CW wave ($E_{CW}$) is scattered from the third mirror 23 as CCW coherent backscattered waves represented generally at $R_{3,CCW}$. The coherent backscattered waves $R_{1,CCW}$, $R_{2,CCW}$, and $R_{3,CCW}$ in combination form the overall CCW backscattered wave in the RLG cavity 9.

Likewise, CCW wave ($E_{CCW}$) is scattered from each of the first, second, and third mirrors 21-23 as CW coherent backscattered waves $R_{1,CW}$, $R_{2,CW}$, and $R_{3,CW}$ respectively. The coherent backscattered waves $R_{1,CW}$, $R_{2,CW}$, and $R_{3,CW}$ in combination form the overall CW backscattered wave in the RLG cavity 9.

Each of the CCW coherent backscattered waves $R_{1,CCW}$, $R_{2,CCW}$, and $R_{3,CCW}$ and each of the CW coherent backscattered waves $R_{1,CW}$, $R_{2,CW}$, and $R_{3,CW}$ has parameters ($r_i$ and $\epsilon_i$) that are unique to the respective mirror, and which depend upon the localization and nature of the scattering site at which each of the waves is incident on the respective mirror (i.e., the first-incidence-spot 41, the second-incidence-spot 42, and the third-incidence-spot 40). The combined backscattering from each of the mirrors 21-23 is a single virtual scattering source representing the coherent combination of the different scattered waves on the mirrors 21-23 in the RLG cavity 9.

The wave scattered from the third-incidence-spot 40 is described mathematically as $R_3 = Er_3 e^{j\epsilon_3}$. The wave scattered from the first-incidence-spot 41 is described mathematically as $R_1 = Er_1 e^{j\epsilon_1} = Er_1 e^{j(\epsilon_1 - 4\pi(l_1 + l_2)/\lambda)}$, where $\lambda$ is the wavelength of the counter-propagating optical beams CCW and CW. The wave scattered from the second-incidence-spot 42 is described mathematically as $R_2 = Er_2 e^{j\epsilon_2} = Er_2 e^{j[(\epsilon_1 - 4\pi l_2)/\lambda]}$.

Figure 2:
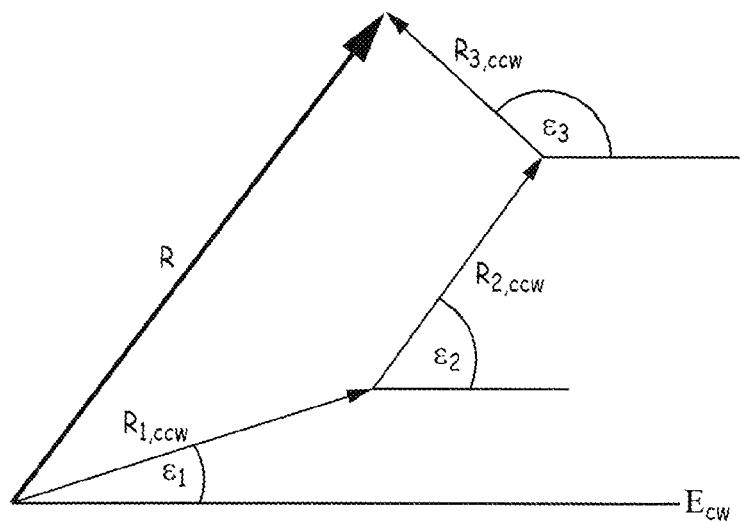
FIG. 2 shows a vector summation of the counter-clockwise (CCW) backscattered waves.

FIG. 2 shows a vector summation of the CCW backscattered waves $R = R_1 + R_2 + R_3$. The combination of the CCW backscattered waves $R = R_1 + R_2 + R_3$ that are scattered from the first-incidence-spot 41, the second-incidence-spot 42, and the third-incidence-spot 40 form the CCW backscattered wave.

Figure 3:
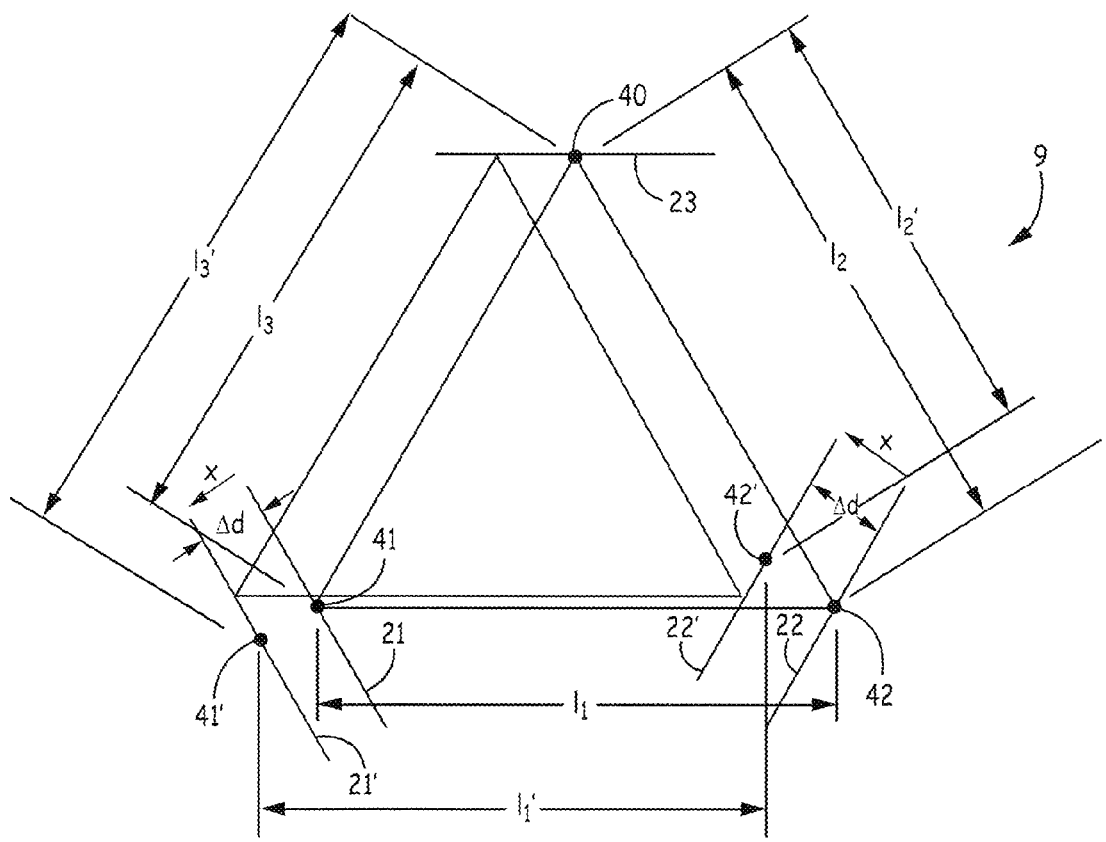
FIG. 3 shows the RLG cavity at a first time and at a second time when random drift improvement (RDI) control has shifted the first mirror and the second mirror in a push-pull manner.

FIG. 3 shows the RLG cavity 9 at a first time $t_1$ and at a second time $t_2$ when RDI control has shifted the first mirror 21 and the second mirror 22 in a push-pull manner by a distance of $\Delta d$. At the first time $t_1$, the first mirror 21 is in (i.e., closer to the third mirror 23) and the second mirror 22 is out (i.e., further to the third mirror 23) and the distance between the first-incidence-spot 21 and second-incidence-spot 22 is $l_1$. At the first time $t_1$, the first-incidence-spot 41 is at the distance 13 from the third-incidence-spot 40 and the second-incidence-spot 42 is at the distance $l_2$ from the third-incidence-spot 40.

At the second time $t_2$, the first mirror (now represented generally at 21') is out and the second mirror (now represented generally at 22') is in and the distance between the first-incidence-spot (now represented generally at 41') and second-incidence-spot (now represented generally at 42') is $l_1'$. At the second time $t_2$, the first-incidence-spot 41' is at the distance $l_3'$ from the third-incidence-spot 40' and the second-incidence-spot 42' is at the distance $l_2'$ from the third-incidence-spot 40. It is to be noted that $(l_1 + l_2 + l_3) = (l_1' + l_2' + l_3')$ and the first backscatter $R_1$ and the second backscatter $R_2$ change phase by equal amounts with RDI control since $l_1$ does not change (i.e., $l_1 = l_1'$). Thus, the backscatter phase difference between the first-incidence-spot 41 and the second-incidence-spot 42 does not change based on RDI control. The wave R3 scattered from the third-incidence-spot 40 and the wave $R_2$ scattered from the second-incidence-spot 42 change in phase by equal amounts since the path length $l_1$ between the first mirror 21 and the second mirror 23 is maintained by RDI control.

However, if the RLG block supporting the RLG cavity 9 expands or contracts, due to thermal effects on the RLG block, the wave $R_1$ scattered from the first-incidence-spot 41 and the wave $R_2$ scattered from the second-incidence-spot 42 have different phase changes due to a change in the separation of the scattering sites. Specifically, if the RLG block experiences an expansion or contraction due to a change in temperature, then the first-incidence-spot 41 and the second-incidence-spot 42 change and the vector R in FIG. 2 is changed.

Figure 4A:
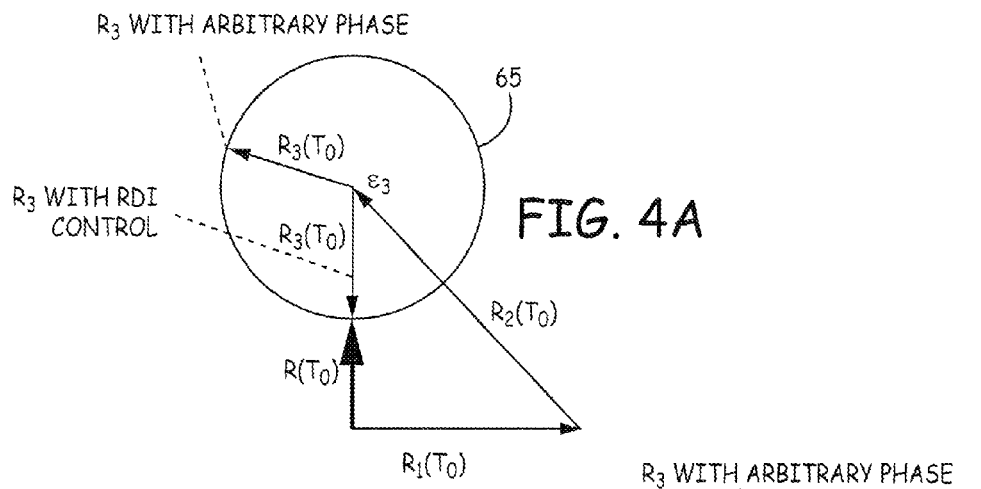
FIGS. 4A-4C show the respective vector summations of the CCW backscattered waves.
Figure 4B:
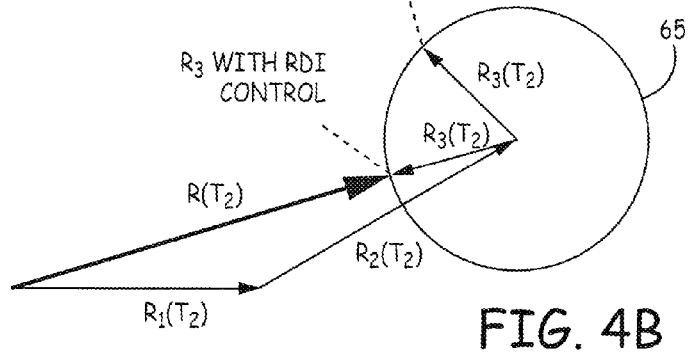
Figure 4C:
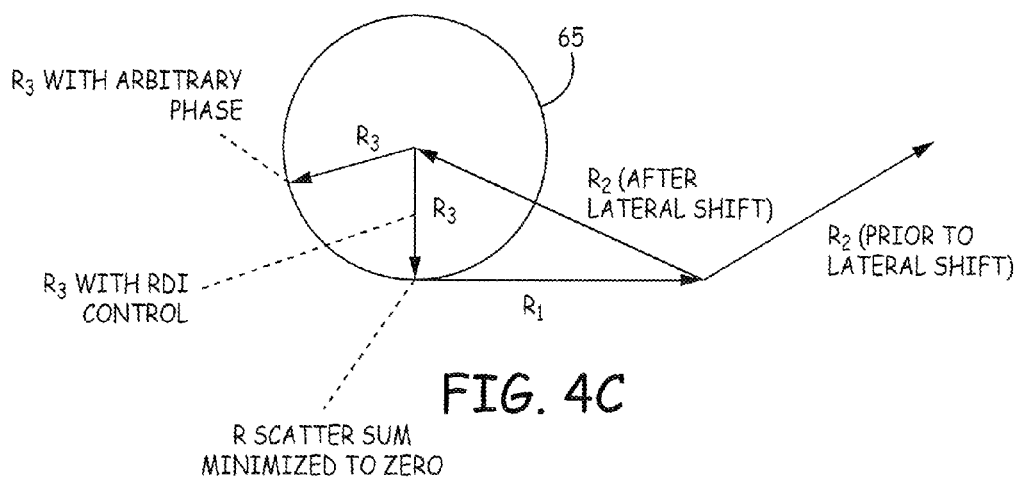

FIGS. 4A-4C show the respective vector summations of the CCW backscattered waves. FIG. 4A shows the respective vector summation $R(T_0)$ of the CCW backscattered waves $R_1(T_0)$, $R_2(T_0)$, and $R_3(T_0)$ at a first temperature $T_0$. FIG. 4B shows the respective vector summation $R(T_2)$ of the CCW backscattered waves $R_1(T_2)$, $R_2(T_2)$, and $R_3(T_2)$ at a second temperature $T_2 = T_0 + \Delta T$. The difference between vector summations $R(T_0)$ and $R(T_2)$ is due to the expansion or contraction of the RLG block caused by a temperature change. This increase in the length of the vector $R(T_2)$ from the length of the vector $R(T_0)$ causes an increase in lock-in and a degradation of the RLG performance.

FIG. 4C shows the respective vectors of the CCW backscattered waves, in which $R_2$ is shown prior to the lateral shift of the second mirror and after the lateral shift of the second mirror. FIG. 4C also shows the CCW backscattered wave $R_3$ with an arbitrary phase and with the RDI control. When RDI control is implemented and the lateral shift of the corners of the RLG block is implemented to offset for expansion or contraction of the RLG block, the vector summation of the CCW backscattered waves $R_1$, $R_2$, and $R_3$ is minimized to zero.

The relative phase of the backscatter waves from the first mirror and the second mirror does not change with RDI control. As the first and second mirror move in the push-pull manner (RDI control) the tip of vector $R_3$ rotates along the circle 65 to arrive at a minimum backscatter sum. However, since the relative phase of the of vectors R1 and R2 does change with an expansion or contraction of the RLG block, the lateral shift of at least one of the corners of the RLG block is used to maintain the minimum backscatter vector summation.

Figure 5:
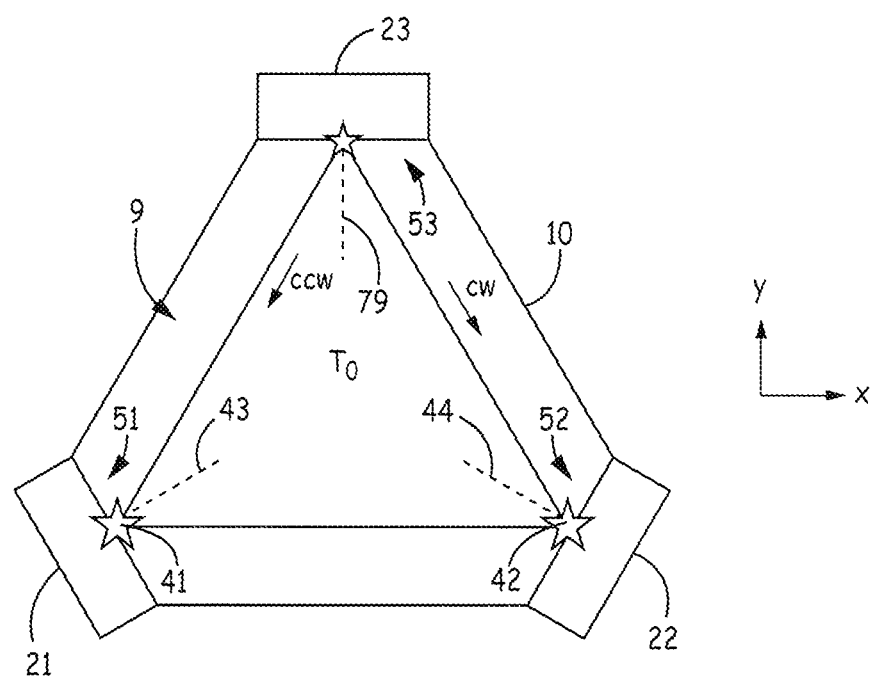
FIG. 5 shows a RLG cavity in an RLG block at a first temperature.

FIG. 5 shows a RLG cavity 9 in an RLG block 10 at a first temperature $T_0$. The three corners represented generally at 51-53 of the RLG block 10 support the respective three mirrors 21-23 that form the RLG cavity 9 (FIG. 1). The RLG block 10 is configured to permit the three mirror RLG cavity 9 to support counter-propagating waves represented generally at CCW and CW. The first-incidence-spot 41 and second-incidence-spot 42 are indicated as stars in FIG. 5 and also in FIGS. 6A-7B. The vector summation of the CCW backscattered waves $R = R_1 + R_2 + R_3$ at the first temperature $T_0$ is as shown in FIG. 4A.

The embodiments of the gyroscope blocks 10 described herein are designed to provide a lateral shift of the corners 51-53 of the body of the RLG block 10 that supports the mirrors 21-23 that form the RLG cavity 9 in order to compensate for block expansion and contraction due to temperature changes. This temperature-compensating lateral shift of corners 51 and 52 effects a lateral translation of the attached first and second transducer mirrors 21-22 in a direction perpendicular to the first normal 43 and the second normal 44 of the respective mirrors 22 and 22 as the temperature of the RLG block 10 changes. Thus, as defined herein, a temperature-compensating lateral shift of the first corner 51 is a shift in the lasing plane X-Y in a direction perpendicular to the normal 43 of the associated first mirror 21, and a temperature-compensating lateral shift of second corner 52 is a shift in the lasing plane X-Y in a direction perpendicular to the normal 44 of the associated second mirror 22. The angles of the mirrors 21-23 remain unchanged with the lateral shifts. This lateral movement is subtle but significant. Only a few micro-inches of lateral movement are required to prevent a backscatter phase change.

If a temperature change causes an expansion of the RLG block 10, then the first corner 51 and the attached first mirror 21 are laterally shifted in the lasing plane X-Y away from the second corner 52 and the attached second mirror 22. If a temperature change causes a contraction of the RLG block 10, then the first corner 51 is laterally shifted in the lasing plane X-Y toward the second corner 52. This lateral shift of the corners 51 and/or 52 of the RLG block 10 ensures that the first-incidence-spot 41 and the second-incidence-spot 42 do not change with a temperature change. Since the first-incidence-spot 41 and the second-incidence-spot 42 do not change with a temperature change, the vector summation of the CCW backscattered waves from the at least three mirrors 21-23 remain constant during the temperature change and the vector summation of the CW backscattered waves from the at least three mirrors 21-23 remain constant during the temperature change.

Figure 6B:
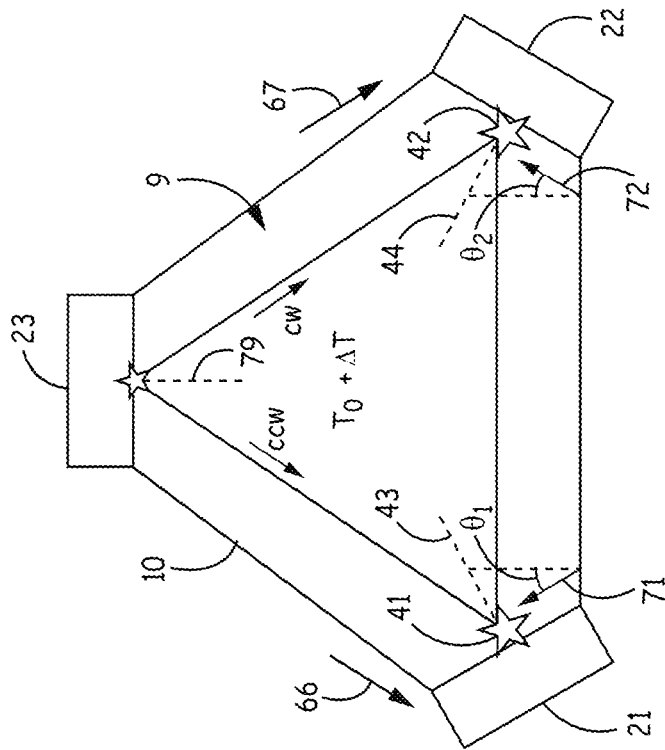
FIG. 6B shows the RLG cavity in the RLG block of FIG. 5 after the first mirror and the second mirrors have been has been laterally shifted away from each other responsive to an expansion due to a temperature change of the RLG block in accordance with the present application.
Figure 6A:
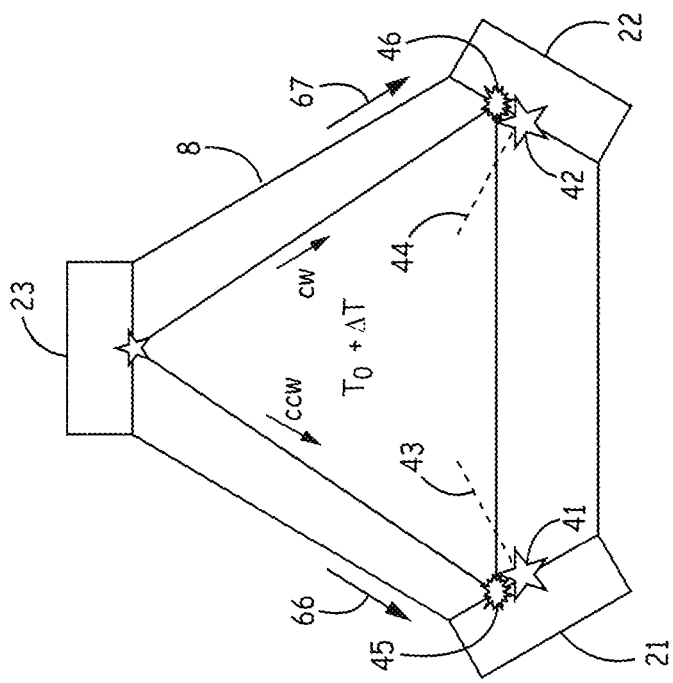
FIG. 6A shows the prior art RLG cavity in the RLG block similar to that shown in FIG. 5 after the prior art RLG block experiences an expansion due to a temperature change.

FIG. 6A shows the prior art RLG cavity in a prior art RLG block 8 similar to that shown in FIG. 5 after the prior art RLG block 8 experiences an expansion due to a temperature change ΔT. As shown in FIG. 6A, the expansion of the RLG block 10 due to the temperature change ΔT causes the first mirror 21 and the second mirror 22 to move away from each other and from the third mirror 23. The arrow 66 indicates the temperature-change-induced movement of the first mirror 21 from the third mirror 23. The arrow 67 indicates the temperature-change-induced movement of the second mirror 22 from the third mirror 23. Due to this shift in the relative positions of the three mirrors 21-23, the counter-propagating optical beams CCW and CW are now incident on a spot 45 on the first mirror 21 that is offset from the first-incidence-spot 41. Likewise, due to this shift in the relative positions of the three mirrors 21-23, the counter-propagating optical beams CCW and CW are now incident on a spot 46 on the second mirror 22 that is offset from the second-incidence-spot 42. Thus, the expansion of the RLG block 10 due to the temperature change ΔT has shifted the counter-propagating optical beams CCW and CW away from the first-incidence-spot 41 and second-incidence-spot 42. The vector summation of the CCW backscattered waves $R'=R_1'+R_2'+R_3'$ at a second temperature $T_0+\Delta T$ is different from the vector summation of the CCW backscattered waves R at the initial temperature $T_0$ (as R' in FIG. 4B differs from R in FIG. 4A). Since R' at second temperature $T_0+\Delta T$ is different from R at the first temperature $T_0$, the RLG experiences an increase in lock-in and poor performance.

FIG. 6B shows the RLG cavity 9 in the RLG block 10 of FIG. 5 after the first mirror 21 has been laterally shifted away from the second mirror 22 responsive to an expansion due to a temperature change ΔT of the RLG block 10 in accordance with the present application. When the first mirror 21 is laterally shifted away from the second mirror 22 to adjust the RLG block 10 for an expansion due to the temperature change ΔT, the counter-propagating optical beams CCW and CW are incident on the first-incidence-spot 41 on the first mirror 21 and the counter-propagating optical beams CCW and CW are incident on the second-incidence-spot 42 of the second mirror 22. In this manner, the RLG does not experience an increase in lock-in and performance is restored or maintained.

As shown in FIG. 6B, the first mirror 21 is shifted in the direction of the arrow 71 and the second mirror 21 is shifted in the direction of the arrow 72 to adjust the RLG block 10 for the temperature change of ΔT. The arrow 71 subtends an angle $\theta_1$ with reference to the normal 79 of the third mirror 23 due to the movement in the direction of the arrow 71. The first mirror 21 is laterally shifted away from the second mirror 22 by the sin $\theta_1$. The arrow 72 subtends an angle $\theta_2$ with reference to the normal 79 of the third mirror 23. The second mirror 22 is laterally shifted away from the first mirror 21 by the sin $\theta_2$ due to the movement in the direction of the arrow 72. In one implementation of this embodiment, $\theta_1=\theta_2$.

In one implementation of this embodiment, either the first mirror 21 or the second mirror 22 is shifted while the other one of the first mirror 21 or the second mirror 22 is stationary. In such an embodiment, the RLG cavity 9 is effectively rotated so the counter-propagating optical beams CCW and CW are incident on the first-incidence-spot 41 on the first mirror 21 and the counter-propagating optical beams CCW and CW are incident on the second-incidence-spot 42.

FIG. 7A shows the prior art RLG cavity in a prior art RLG block 8 similar to that shown in FIG. 5 after the prior art RLG block 8 experiences a contraction due to a temperature change. As shown in FIG. 7A, the contraction due to the temperature change ΔT causes the first mirror 21 and the second mirror 22 to move toward each other and toward the third mirror 23. The arrow 68 indicates the temperature-change-induced movement of the first mirror 21 toward the third mirror 23. The arrow 69 indicates the temperature-change-induced movement of the second mirror 22 toward the third mirror 23. Due to this shift in the relative positions of the three mirrors 21-23, the counter-propagating optical beams CCW and CW are now incident on a spot 47 on the first mirror 21 that is offset from the first-incidence-spot 41. Likewise, due to this shift in the relative positions of the three mirrors 21-23, the counter-propagating optical beams CCW and CW are now incident on a spot 48 on the second mirror 22 that is offset from the second-incidence-spot 42. Thus, the contraction due to the temperature change ΔT has shifted the counter-propagating optical beams CCW and CW away from the first-incidence-spot 41 and second-incidence-spot 42. The vector summation of the CCW backscattered waves $R=R_1+R_2+R_3$ at a second temperature $T_0-\Delta T$ is different from the vector summation of the CCW backscattered waves R at the initial temperature $T_0$. Since R at second temperature $T_0-\Delta T$ is different from R at the first temperature $T_0$, the RLG experiences increased lock-in and poor performance.

FIG. 7B shows the RLG cavity 9 of the RLG block 10 of FIG. 5 after the first mirror 21 and the second mirror 22 have been laterally shifted toward each other responsive to the contraction due to the temperature change ΔT of the RLG block 10 in accordance with the present application. When the first mirror 21 is laterally shifted toward the second mirror 22 to adjust the RLG block 10 for the contraction due to the temperature change ΔT, the counter-propagating optical beams CCW and CW are incident on the first-incidence-spot 41 on the first mirror 21 and the counter-propagating optical beams CCW and CW are incident on the second-incidence-spot 42 of the second mirror 22. In this manner, the RLG does not experience an increase in lock-in and performance is restored or maintained.

As shown in FIG. 7B, the first mirror 21 is shifted in the direction of the arrow 73 and the second mirror 21 is shifted in the direction of the arrow 74 to adjust the RLG block 10 for the contraction due to the temperature decrease of ΔT. The arrow 73 subtends an angle $\gamma_1$ with reference to the normal 79 of the third mirror 23. The first mirror 21 is laterally shifted toward the second mirror 22 by the sin $\gamma_1$ due to the movement in the direction of the arrow 73. The arrow 74 subtends an angle $\gamma_2$ with reference to the normal 79 of the third mirror 23. The second mirror 22 is laterally shifted toward the first mirror 21 by the sin $\gamma_2$ due to the movement in the direction of the arrow 74. In one implementation of this embodiment, $\gamma_1=\gamma_2$.

In another implementation of this embodiment, either the first mirror 21 or the second mirror 22 is shifted while the other one of the first mirror 21 or the second mirror 22 is stationary. In such an embodiment, the RLG cavity 9 is effectively rotated so the counter-propagating optical beams CCW and CW are incident on the first-incidence-spot 41 on the first mirror 21 and the counter-propagating optical beams CCW and CW are incident on the second-incidence-spot 42.

The lateral shifting of first and second mirrors 21 and 22 is provided by a shift of the first and second corners 51 and 52, respectively, of the RLG block 10 to which the first and second mirrors 21 and 22 are attached. The lateral shifting of first and second corners 51 and 52 occurs along the in-plane (X-Y) direction of the RLG. The lateral shifting of first and second corners 51 and 52 ensures: 1) the first-incidence-spot 41 of the first mirror 21 is unchanged; 2) the second-incidence-spot 42 of the second mirror 22 is unchanged; and 3) the optical path length $n(l_1+l_2+l_3)$ of the counter-propagating optical laser beams CCW and CW remains the same. There are several techniques described herein to cause a lateral translation of the corners 51 and 52 of the RLG block 10 along the in-plane (X-Y) direction. The lateral translation of first and second corners 51 and 52 along with the RDI control, provides a RLG that includes the RLG block with the ability to minimize (or in most cases eliminate) the backscatter contributions of all three mirrors 21-23 simultaneously. Since thermal changes occur at a slow rate the feedback control frequency for the lateral translation is much lower than the feedback control frequency of the RDI control loop. Typically, the RDI modulation used to hunt for minimum scatter is on the order of 10 kHz.

It has been observed that when using a low thermal expansion material for the RLG block, such as "zero-dur" (Schott), the change in phase between the transducer mirrors backscatter throughout the devices operational temperature range, may be less than $2\pi$. In this case, although not as effective as an active control loop (described previously), the shape of the RLG block may be altered, in a passive manner, by various methods that introduce stress into the bulk material of the RLG block to cause a corner of the RLG block to shift laterally. Such methods may include abrading a portion of the surface with grinding, laser engraving, diamond tool machining, or grit blasting (Twyman effect). Another stress introducing method may include 3D laser engraving an internal portion of the RLG block, causing a lateral shift to a corner of the RLG block. Another stress introducing method may include mounting a mechanical spring which applies a direct force to the RLG block causing a lateral shift to a corner of the RLG block. In practice, an assembled RLG would be characterized for backscatter, and then altered with one of the above mentioned stress introducing methods, which would change the backscatter phasing of the mirrors in order to minimize the effects of backscatter.

Figure 8:
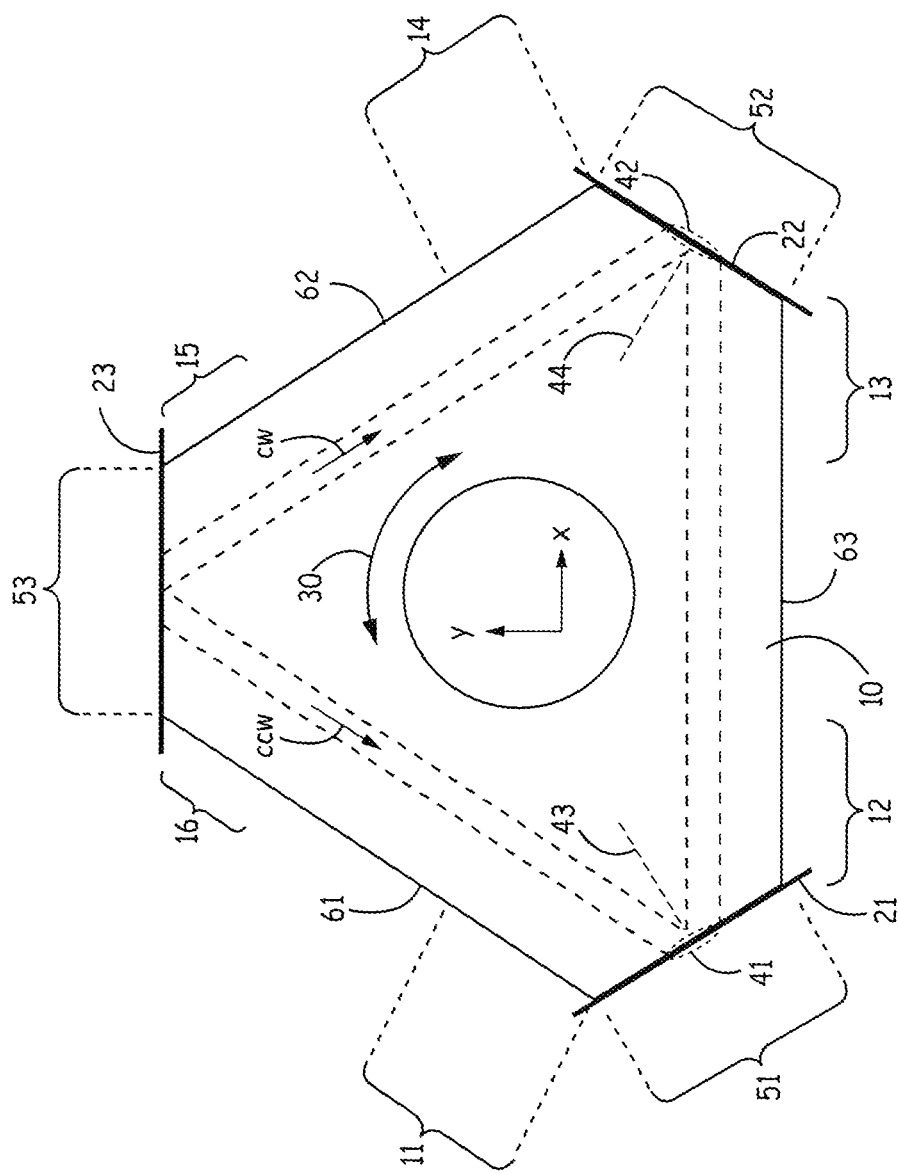
FIG. 8 shows details of the corners of an exemplary RLG block in accordance with the present application.

FIG. 8 shows details of the corners 51-53 of an exemplary RLG block 10 in accordance with the present application. The RLG block 10 includes a first corner 51 bordered by a first portion 11 of a first side 61 of the RLG block 10 and a first portion 12 of a third side 63 of the RLG block 10, a second corner 52 bordered by a first portion 14 of a second side 62 of the RLG block 10 and a second portion 13 of the third side 63 of the RLG block 10, a third corner 53 bordered by a second portion 15 of the second side 62 and a second portion 16 of the first side 61 of the RLG block 10.

In one implementation of this embodiment, the first portion 11 of the first side 61: shifts the first corner 51 laterally toward the second corner 52 in the lasing plane X-Y of the RLG block 10 when a temperature change of the RLG block 10 causes a contraction of the RLG block 10; and shifts the first corner 51 laterally away from the second corner 52 in the lasing plane X-Y of the RLG block 10 when a temperature change of the RLG block 10 causes an expansion of the RLG block 10.

In one implementation of this embodiment, the first portion 11 of the first side 61 is passively configured to cause the shift. Specifically, the first portion 11 of the first side 61 is passively configured based on a processing technique (e.g., forming micro-fractures by one or more of grinding, diamond tool machining or grit blasting or forming at least one cavity) applied to the surface first portion 11 of the first side 61 in order to ensure a passive shifting based on a temperature change. In one implementation of this embodiment, the designer of the RLG block characterizes the RLG block 10 based the backscatter measurements of the RLG block 10 to determine how to form the forming micro-fractures or forming at least one cavities to provide the required lateral shift to ensure the first-incidence-spot 41 of the first mirror 21 and the second-incidence-spot 42 of the second mirror 22 is maintained during a thermal expansion or a thermal contraction of the RLG block 10. By ensuring the first-incidence-spot 41 of the first mirror 21 and the second-incidence-spot 42 of the second mirror 22 is maintained during a thermal expansion or a thermal contraction, lock-in is prevented since the vector summations of CCW and CW backscattered waves from the three mirrors 21-23 remain constant during the temperature change.

In another implementation of this embodiment, the configuration is an active configuration that causes the shift based on an attachment of an electrically-controlled element on or in the first portion 11 of the first side 61. In yet another implementation of this embodiment, a temperature sensor on or near the RLG block 10 is communicatively coupled to a feedback circuit. In this case, when the feedback circuit determines a temperature change of the RLG block 10 has exceeded a preselected-temperature-change threshold, a signal is generated at the feedback circuit and is sent to the electrically-controlled element to ensure an active shifting based on the temperature change.

In yet another implementation of this embodiment, the first portion 14 of the second side 62 is actively or passively configured to: shift the second corner laterally toward the first corner in the lasing plane X-Y of the RLG block when a temperature change of the RLG block causes a contraction of the RLG block; and shift the second corner laterally away from the first corner in the lasing plane X-Y of the ring laser gyroscope block when a temperature change of the ring laser gyroscope block causes an expansion of the ring laser gyroscope block.

In yet another implementation of this embodiment, the first portion 11 of the first side 61 and the first portion 14 of the second side 62 are actively or passively configured to effect the above described shifting of the first corner 51 and the second corner 52.

In yet another implementation of this embodiment, the first portion 11 of the first side 61, the first portion 12 of the third side 63, the first portion 14 of the second side 62, and the second portion 13 of the third side 63 of the RLG block 10 are all actively or passively configured to effect the above described shifting of the first corner 51 and the second corner 52.

In yet another implementation of this embodiment, the first portion 12 of the third side 63 and the second portion 13 of the third side 63 of the RLG block 10 are actively or passively configured to effect the above described shifting of the first corner 51 and the second corner 52.

FIGS. 9A-9D show various embodiments of RLG blocks 10 in accordance with the present invention. In FIGS. 9A-9D, an optional temperature sensor 120 is attached to the RLG block 10 to sense the temperature of the RLG block 10. In some embodiments, there is no temperature sensor 120. The RLG blocks 10 shown in FIGS. 9A-9D ensure that a first-incidence-spot 41 of a first mirror and a second-incidence-spot 42 of a second mirror 22 are maintained during a thermal expansion or a thermal contraction of the RLG block 10. In this manner, the RLG blocks 10 shown in FIGS. 9A-9D ensure the vector summation of CCW backscattered waves from the three mirrors 21-23 and the vector summation of CW backscattered waves from the three mirrors 21-23 remain constant during an expansion or contraction due to a temperature change.

Figure 9A:
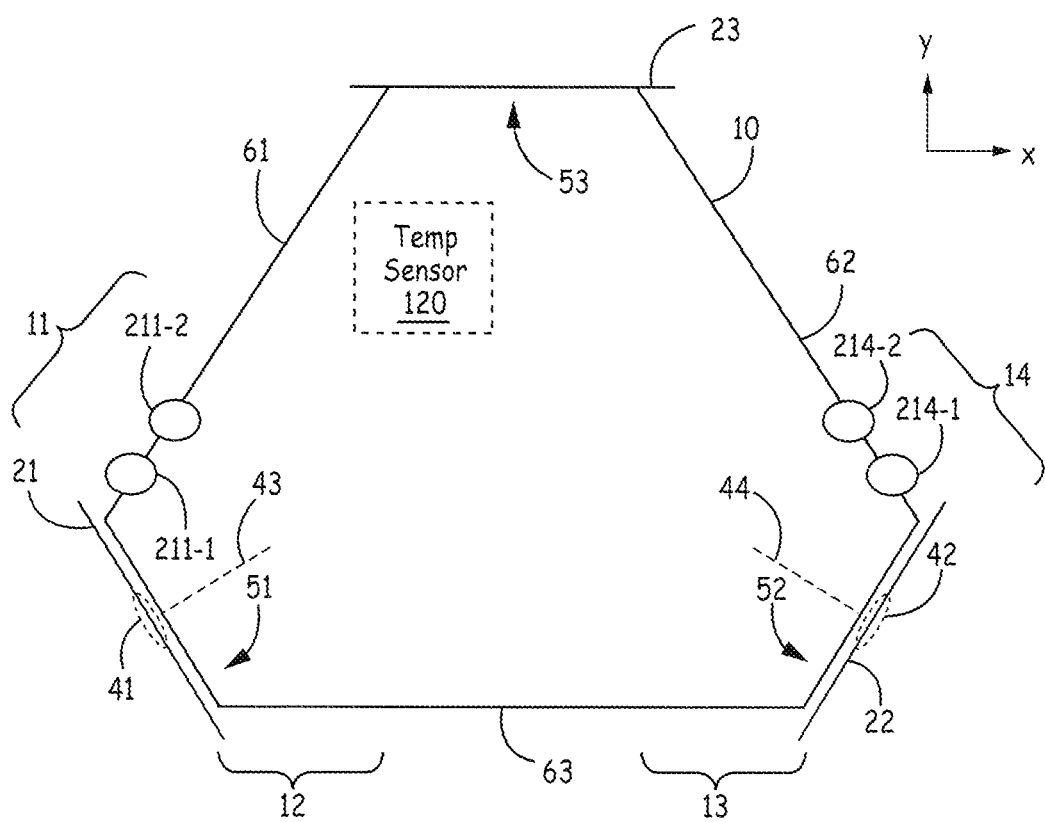
FIGS. 9A-9D show various embodiments of RLG blocks in accordance with the present invention.

As shown in FIG. 9A, a first electrically-controlled element 211-1 and a first electrically-controlled element 211-2 are attached to (positioned on) the first portion 11 of the first side 61 of the RLG block 10 and a second electrically-controlled element 214-1 and a second electrically-controlled element 214-2 are attached to the first portion 14 of the second side 62.

The electrically-controlled elements 211-1 and 211-2 on the first portion 11 of the first side 61 are used to: shift the first corner 51 laterally in the lasing plane X-Y of the RLG block 10 toward the second corner 52, and perpendicular to the first normal 43 of the first mirror 21 (arrow 73 in FIG. 7B) associated with the first corner 51 when a temperature change of the RLG block 10 causes a contraction of the RLG block 10; shift the first corner 21 laterally away from the second corner 52, and perpendicular to the first normal 42 of first mirror 21 (arrow 71 in FIG. 6B) when the temperature change of the RLG block 10 causes an expansion of the RLG block 10.

Likewise, the electrically-controlled elements 214-1 are 214-2 on the first portion 14 of the second side 62 are used to: shift the second corner 52 laterally in the lasing plane X-Y toward the first corner 51, and perpendicular to a second normal 44 of the second mirror 22 (arrow 74 in FIG. 7B) associated with the second corner 52 when a temperature change of the RLG block 10 causes a contraction of the RLG block 10; and shift the second corner 52 laterally in the lasing plane X-Y away from the first corner 51, and perpendicular to the second normal 44 of the second mirror 22 (arrow 72 in FIG. 6B) when a temperature change of the RLG block 10 causes an expansion of the RLG block 10.

Figure 9B:
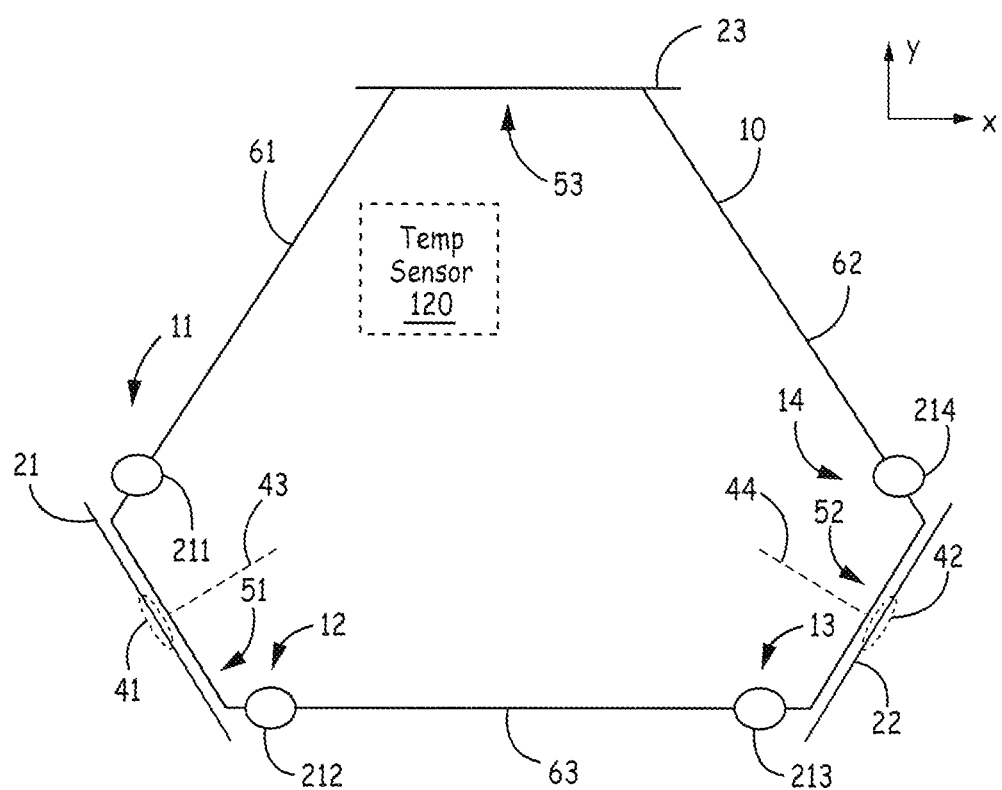

As shown in FIG. 9B, a first electrically-controlled element 211 is attached to the first portion 11 of the first side 61, a second electrically-controlled element 214 is attached to the first portion 14 of the second side 62, a third electrically-controlled element 212 is attached to a first portion 12 of a third side 63; and a fourth electrically-controlled element 213 is attached to the second portion 13 of the third side 63. A temperature sensor 120 is attached to the RLG block 10 to sense the temperature of the RLG block 10.

The first electrically-controlled element 211 and the third electrically-controlled element 212 are used to: shift the first corner 51 laterally in the lasing plane X-Y of the RLG block 10 toward the second corner 52, and perpendicular to the first normal 43 of the first mirror 21 associated with the first corner 51 when a temperature change of the RLG block 10 causes a contraction of the RLG block 10; shift the first corner 21 laterally away from the second corner 52, and perpendicular to the first normal 43 when the temperature change of the RLG block 10 causes an expansion of the RLG block 10.

Likewise, the second electrically-controlled element 214 and the fourth electrically-controlled element 213 are used to: shift the second corner 52 laterally in the lasing plane X-Y toward the first corner 51, and perpendicular to the second normal 44 of the second mirror 22 associated with the second corner 52 when a temperature change of the RLG block 10 causes a contraction of the RLG block 10; and shift the second corner 52 laterally in the lasing plane X-Y away from the first corner 51, and perpendicular to the second normal 44 of the second mirror 22 when a temperature change of the RLG block 10 causes an expansion of the RLG block 10.

Figure 9C:
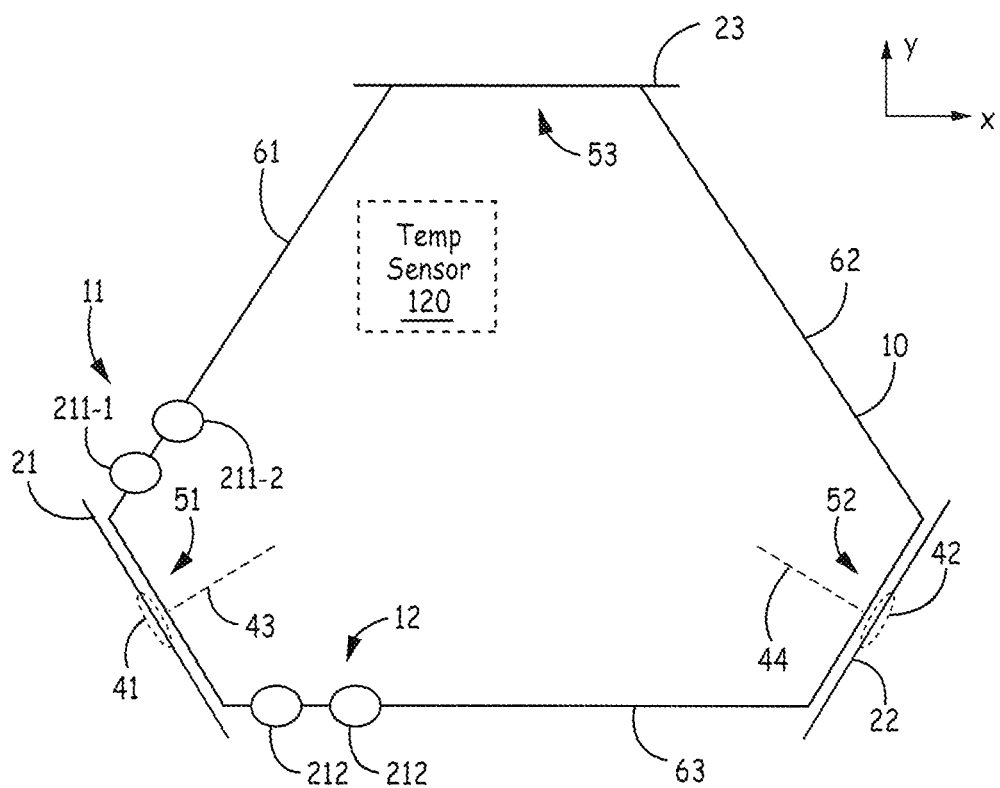

As shown in FIG. 9C, a first electrically-controlled element 211-1 and a first electrically-controlled element 211-2 are attached to (positioned on) the first portion 11 of the first side 61 and a third electrically-controlled element 212-1 and a third electrically-controlled element 212-2 are attached to the first portion 12 of the third side 63.

The first electrically-controlled elements 211(1-2) and the third electrically-controlled elements 212(1-2) are used to: shift the first corner 51 laterally in the lasing plane X-Y of the RLG block 10 toward the second corner 52, and perpendicular to the first normal 43 of the first mirror 21 associated with the first corner 51 when a temperature change of the RLG block 10 causes a contraction of the RLG block 10; shift the first corner 21 laterally away from the second corner 52, and perpendicular to the first normal 43 when the temperature change of the RLG block 10 causes an expansion of the RLG block 10. In this embodiment, the second corner 52 is not shifted by any passive or active techniques.

Figure 9D:
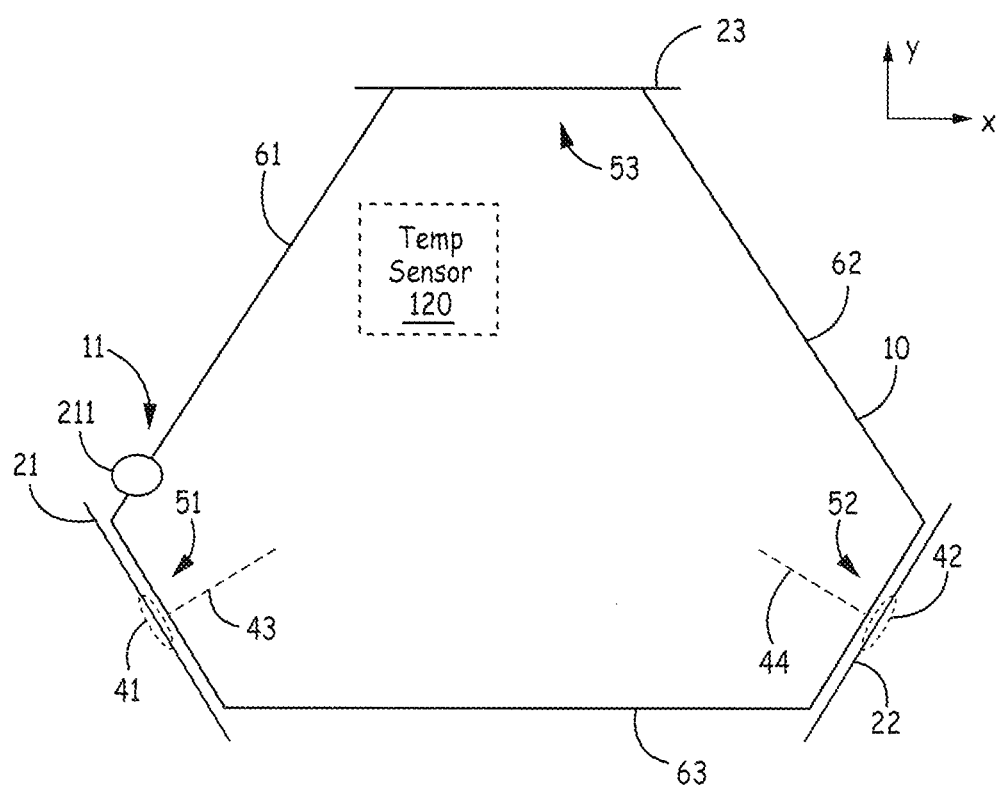

As shown in FIG. 9D, a first electrically-controlled element 211 is attached to (positioned on) the first portion 11 of the first side 61 of the RLG block 10. The first electrically-controlled element 211 is used to: shift the first corner 51 laterally in the lasing plane X-Y of the RLG block 10 toward the second corner 52, and perpendicular to the first normal 43 of the first mirror 21 associated with the first corner 51 when a temperature change of the RLG block 10 causes a contraction of the RLG block 10; and shift the first corner 21 laterally away from the second corner 52, and perpendicular to the first normal 43 when the temperature change of the RLG block 10 causes an expansion of the RLG block 10. In this embodiment, the second corner 52 is not shifted by any passive or active techniques.

Figure 10A:
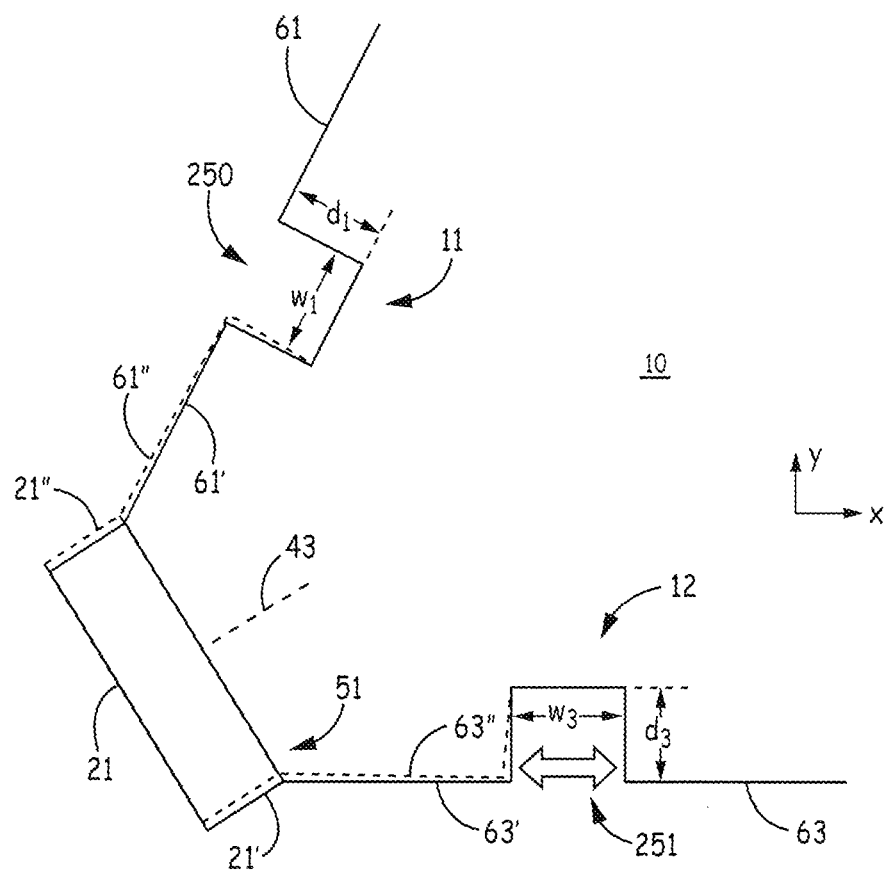
FIG. 10A shows an enlarged view of the first mirror shifted laterally in plane in accordance with the present invention.

FIG. 10A shows an enlarged view of the first mirror 21 shifted laterally in plane in accordance with the present invention. As shown in FIG. 10A, the first portion 11 of the first side 61 of the RLG block 10 includes a cavity 250 and the first portion 12 of the third side 63 includes a cavity 251.

In one implementation of this embodiment, the embodiment of the first corner 51 is passively configured to shift the first mirror 21 laterally. In this case, the widths $W_1$ and $W_3$ and depths $d_1$ and $d_3$ of the respective cavities 250 and 251 are designed based on the properties of the material used to form the RLG block 10 to allow the corner 51 to: 1) flex the first side 61 adjacent to the first mirror 21 from a first position (shown in a solid line 61') to a second position (shown as a dashed line 61"); and 2) flex the third side 63 adjacent to the first mirror 21 from a first position (shown in a solid line 63') to a second position (shown as a dashed line 63"). As is understood by one skilled in the art, the flex is bidirectional to allow the corner 51 to: 1) flex the first side 61 adjacent to the first mirror 21 to the first position (shown in a solid line 61') from the second position (shown as a dashed line 61"); and 2) flex the third side 63 adjacent to the first mirror 21 to the first position (shown in a solid line 63') from the second position (shown as a dashed line 63"). The amount of bidirectional flex is designed to offset any expansion or contraction due to a temperature change of the RLG block 10.

In another implementation of this embodiment, a first electrically-controlled element is inserted in the cavity 250 to pull the first side 61 adjacent to the first mirror 21 from a first position (shown in a solid line 61') to a second position (shown as a dashed line 61") and a second electrically-controlled element is inserted in the cavity 251 to push the third side 63 adjacent to the first mirror 21 from a first position (shown in a solid line 63') to a second position (shown as a dashed line 63"). The amount of bidirectional push and pull is designed to offset any expansion or contraction due to a temperature change of the RLG block 10.

Figure 10B:
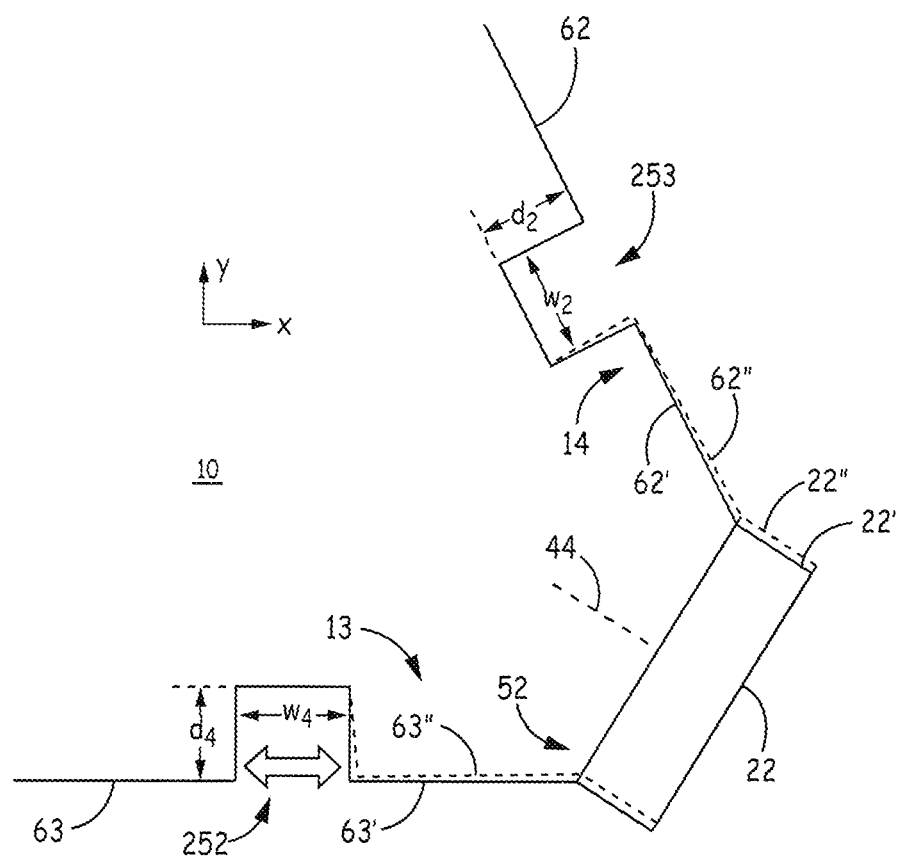
FIG. 10B shows an enlarged view of the second mirror shifted laterally in plane in accordance with the present invention.

FIG. 10B shows an enlarged view of the second 22 mirror shifted laterally in plane in accordance with the present invention. As shown in FIG. 10B, the first portion 14 of the second side 62 of the RLG block 10 includes a cavity 253 and the second portion 13 of the third side 63 includes a cavity 252.

In one implementation of this embodiment, the embodiment of the second corner 52 is passively configured to shift the second mirror 22 laterally. In this case, the widths $W_2$ and $W_4$ and depths $d_2$ and $d_4$ of the respective cavities 253 and 252 are designed based on the properties of the material used to form the RLG block 10 to allow the second corner 52 to: 1) flex the second side 62 adjacent to the second mirror 22 from a first position (shown in a solid line 62') to a second position (shown as a dashed line 62"); and 2) flex the third side 63 adjacent to the second mirror 22 from a first position (shown in a solid line 63') to a second position (shown as a dashed line 63"). The amount of bidirectional flex is designed to offset any expansion or contraction due to a temperature change of the RLG block 10.

In another implementation of this embodiment, a second electrically-controlled element is inserted in the cavity 253 to pull the second side 62 adjacent to the second mirror 22 from a first position (shown in a solid line 62') to a second position (shown as a dashed line 62") and a fourth electrically-controlled element is inserted in the cavity 252 to push the third side 63 adjacent to the second mirror 22 from a first position (shown in a solid line 63') to a second position (shown as a dashed line 63"). The amount of bidirectional push and pull is designed to offset any expansion or contraction due to a temperature change of the RLG block 10.

In one implementation of this embodiment, the first, second, third and fourth electrically-controlled elements are piezo-electric (PZT) actuators positioned in the respective cavities 250, 251, 252, and 253. In this case, the push-pull is provided by the appropriate contraction or expansion of the PZT actuator in the cavity. Exemplary embodiments that in include PZT actuators are shown and described below with reference to FIGS. 11A-11D.

FIGS. 11A-11D show exemplary embodiments of RLG blocks 411-414 in accordance with the present invention. The RLG blocks 411-414 shown in FIGS. 11A-11D ensure that the first-incidence-spot 41 of the first mirror 21 and the second-incidence-spot 42 of the second mirror 22 are maintained during a thermal expansion or a thermal contraction of the RLG blocks 411-414. In this manner, the RLG blocks 411-414 shown in FIGS. 11A-11D ensure the vector summation of CCW backscattered waves from the three mirrors (not shown for ease of viewing) associated with the three corners 51-53, respectively, and the vector summation of CW backscattered waves from the three mirrors associated with the three corners 51-53, respectively, remain constant during a temperature change. In one implementation of this embodiment, the RLG blocks 411-414 include four or more mirrors. The embodiments of FIGS. 11A-11D show two piezo-electric (PZT) actuators in various types of cavities that are in the first portion 11 of the first side 61 of the RLG block and in the first portion 14 of the second side 62 of the RLG block. Although each of the piezo-electric (PZT) actuators are connected to at least one voltage power supply (shown below with reference to FIG. 13) the wire connecting the PZT actuators to the voltage power supply is not shown in FIGS. 11A-11D for ease of viewing.

In some embodiments of RLG blocks 410-414, the second corner is the same as the first corner 51.

Figures 11A, 11B:
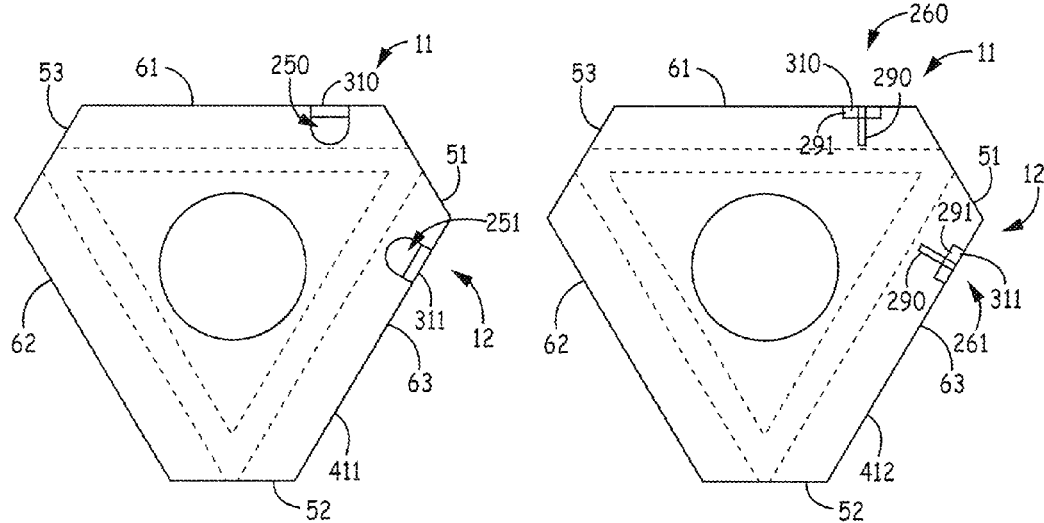
FIGS. 11A-11D show various embodiments of RLG blocks in accordance with the present invention.

As shown in FIG. 11A, a first PZT 310 is in a cavity 250 in the first portion 11 of the first side 61 of the RLG block 411. A second PZT 311 is in a cavity 251 in the first portion 12 of the third side 63 of the RLG block 411. The cavities 250 and 251 are U-shaped grooves machined in the respective first side 61 and third side 63 of the RLG block 411. The first PZT 310 and second PZT 311 operate in opposing modes to laterally shift the first corner 51 as described above. When the first PZT 310 expands to push the first portion 11 of the first side 61, the second PZT 311 contracts to pull the first portion 12 of the third side 63. In this manner, the first corner 51 is laterally shifted in the lasing plane X-Y, toward the second corner 52, and perpendicular to the first normal of the first mirror (not shown in FIG. 11A) when a temperature change of the RLG block 411 causes a contraction of the RLG block 411.

Likewise, when the first PZT 310 contracts to pull the first portion 11 of the first side 61, the second PZT 311 expands to push the first portion 12 of the third side 63. In this manner, the first corner 51 is laterally shifted in the lasing plane X-Y, away from the second corner 52, and perpendicular to the first normal of the first mirror (not shown in FIG. 11A) when a temperature change of the RLG block 411 causes an expansion of the RLG block 411.

In one implementation of this embodiment, the PZT 310 and 311 are Thorlabs AE0203D04F PZT actuators that are mounted in the respective cavities 250 and 251 with JB Weld epoxy. Other types of PZT actuators and/or adhesives can be used.

FIG. 11B, shows a RLG block 413 that differs from the RLG block 411 of FIG. 11A by the shape of the cavities 260 and 261 that hold the first PZT 310 and second PZT 311. The cavities 260 and 261 are formed by cutting a deep narrow groove 291 into the respective first side 61 and third side 63 of the RLG block 412 and then machining a rectangular cavity 291 that intersects with the deep narrow groove 290 in the respective first side 61 and third side 63 of the RLG block 412. The rectangular cavity 291 is sized to hold the PZT 310 and PZT 311 with sufficient space for the adhesive (not shown).

Figures 11C, 11D:
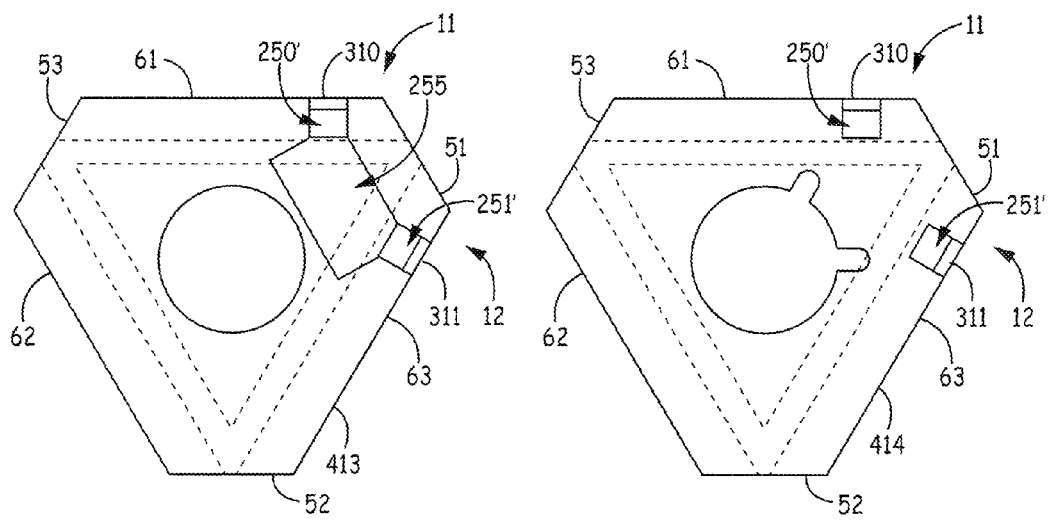

FIG. 11C, shows a RLG block 412 that differs from the RLG block 411 of FIG. 11A by an additional shallow-connecting-cavity 255 that contacts the bottom of the cavities 250' and 251'. The cavities 250' and 251' are rectangular shaped and portions of the bottoms of the cavities 250' and 251' contact the shallow-connecting-cavity 255. The rectangular cavity 291 is sized to hold the PZT 310 and PZT 311 with sufficient space for the adhesive (not shown). The removal of material from the RLG block 413 in this manner, is designed to reduce the voltage required on the PZT 310 and PZT 311 to laterally shift the first corner 51. In one implementation of this embodiment, the designer of the RLG block 413 uses software modeling to find the best depth and shape of the shallow-connecting-cavity 255.

The first PZT 310 is in the cavity 250' in the first portion 11 of the first side 61 of the RLG block 411. The second PZT 311 is in the cavity 251' in the first portion 11 of the third side 63 of the RLG block 413.

In one implementation of this embodiment, there is a shallow-connecting-cavity 255 on the triangularly-shaped top surface and the bottom surface of the RLG block 413.

FIG. 11D, shows a RLG block 414 that differs from the RLG block 411 of FIG. 11A by the shape of the cavities 250 and 251 that hold the first PZT 310 and second PZT 311. The cavities 250' and 251' are rectangular-shaped grooves with a flat bottom machined in the respective first side 61 and third side 63 of the RLG block 414. The first PZT 310 is in the cavity 250' in the first portion 11 of the first side 61 of the RLG block 414. The second PZT 311 is in the cavity 251' in the first portion 11 of the third side 63 of the RLG block 414.

Figure 12A:
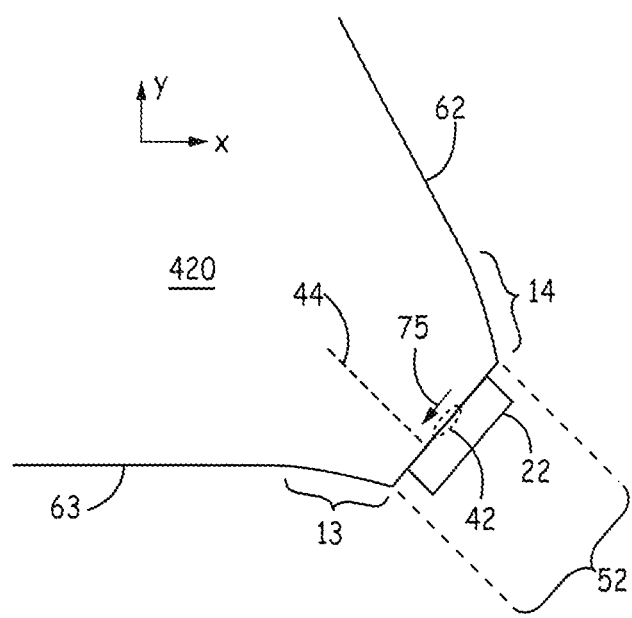
FIGS. 12A-12C show enlarged views of a second corner of respective passively-configured RLG blocks, in which the second corner is passively shifted, in accordance with the present invention.
Figure 12B:
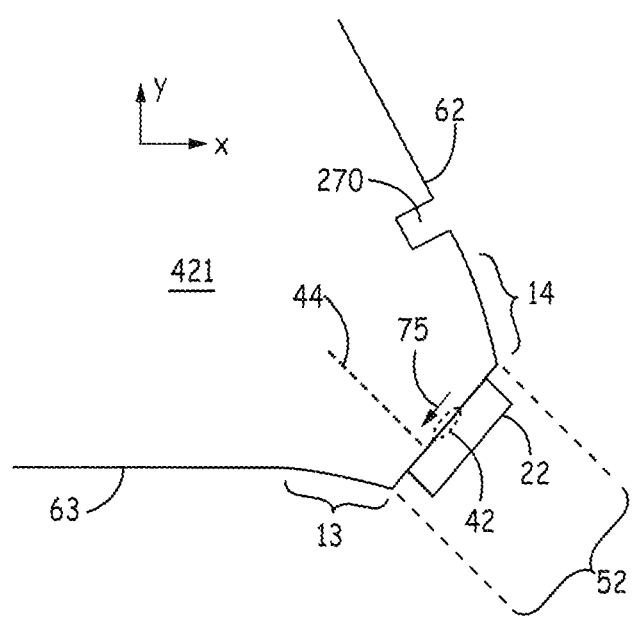
Figure 12C:
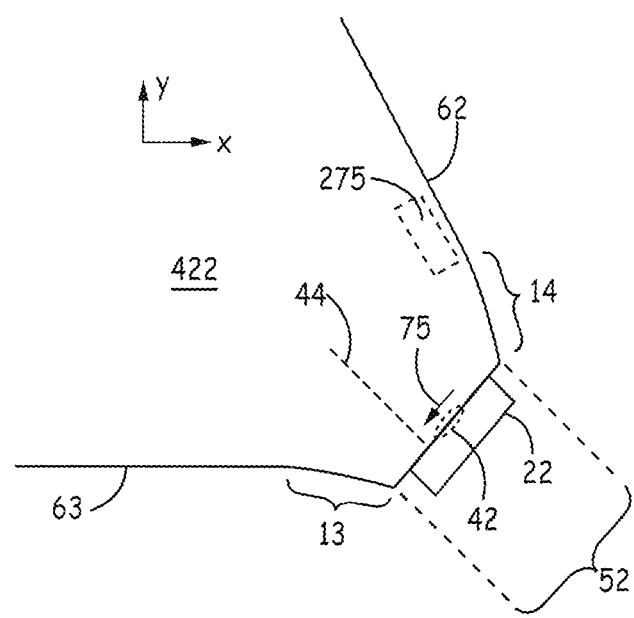

FIGS. 12A-12C show enlarged views of a second corner 52 of respective passively-configured RLG blocks 420-422, in which the second corner 52 is passively shifted, in accordance with the present invention. The passively-configured RLG blocks 420-422 are machined to make the glass more flexible. Since RLG blocks 420-422 are passively-configured, a temperature sensor is not attached to the RLG blocks 420-422. Instead, the shifting of the corners occurs responsive to the temperature change without any required feedback. The RLG blocks 420-422 shown in FIGS. 12A-12C ensure that the first-incidence-spot 41 of the first mirror 22 and the second-incidence-spot 42 of the second mirror 22 are maintained during a thermal expansion or a thermal contraction of the RLG blocks 420-422. In this manner, the RLG blocks 420-422 shown in FIGS. 12A-12C ensure the vector summation of CCW backscattered waves from the three mirrors (not shown for ease of viewing) associated with the three corners 51-53, respectively, and the vector summation of CW backscattered waves from the three mirrors associated with the three corners 51-53, respectively, remain constant during a temperature change. In one implementation of this embodiment, the RLG blocks 420-422 include four or more mirrors.

As shown in FIGS. 12A-12C, the second corner 52 is bordered by the first portion 14 of the second side 62 of the RLG block 10 and the second portion 13 of the third side 63 of the RLG block 421. The second mirror 22 is attached to the second corner 52. As shown in each of FIGS. 12A-12C, the second corner 52 is shown in a laterally shifted position (in direction of the arrow 75) that occurs when a temperature change of the RLG block 420, 421, or 422 causes a contraction of the RLG block 420, 421, or 422. It is to be understood that the second corner 52 is laterally shifted in the opposite direction of arrow 75 when a temperature change of the RLG block 420, 421, or 422 causes an expansion of the RLG block 420, 421, or 422. The first corners 51 of the RLG blocks 420-422 are not visible. In one implementation of this embodiment, the first corners 51 of the RLG blocks 420-422 are also passively-configured to laterally shift toward the second corner 52 when a temperature change of the RLG block 420, 421, or 422 causes a contraction of the RLG block 420, 421, or 422 and to laterally shift away from the second corner 52 when a temperature change of the RLG block 420, 421, or 422 causes an expansion of the RLG block 420, 421, or 422. In this manner, the second-incidence-spot 42 of the second mirror 22 is maintained during a thermal expansion or thermal contraction of the RLG block 420, 421, or 422 and the vector summation of counter-clockwise backscattered waves and the vector summation of clockwise backscattered waves from the at least three mirrors remains constant during the temperature change.

As shown in FIG. 12A, the first portion 14 and the second portion 13 have been prepared by forming micro-fractures (not visible) on the first portion 14 of the second side 62 and the second portion 13 of the third side 63 of the RLG block 420. The micro-fractures cause the second corner 52 to shift laterally in the lasing plane X-Y, and perpendicular to the second normal 44 of the second mirror 22 when the RLG block 420 thermally expands or thermally contracts due to the temperature change. When the micro-fractures are formed on the first portion 14 of the second side 62 and the second portion 13 of the third side 63 the RLG block 420 is calibrated. In one implementation of this embodiment, the micro-fractures are only formed one either the first portion 14 of the second side 62 or the second portion 13 of the third side 63.

As shown in FIG. 12B, a first cavity 270 is formed in the first portion 11 of the first side 61 of the RLG block 421. The first cavity 270 causes the second corner 52 to shift laterally in the lasing plane X-Y, and perpendicular to the second normal 44 of the second mirror 22 when the RLG block 421 thermally expands or thermally contracts due to the temperature change. In one implementation of this embodiment, a second cavity is formed in the second portion 13 of the third side 63. In another implementation of this embodiment, there is only a second cavity on the second portion 13 of the third side 63 and none on the first portion 11 of the first side 61 of the RLG block 421.

As shown in FIG. 12C, a first-interior cavity 275 is formed within in the first portion 11 of the first side 61 of the RLG block 421. In one implementation of this embodiment, the first-interior cavity 275 is 3-dimensional (3D) laser engraved in an internal portion of the RLG block 421. The first-interior cavity 275 causes the second corner 52 to shift laterally in the lasing plane X-Y, and perpendicular to the second normal 44 of the second mirror 22 when the RLG block 421 thermally expands or thermally contracts due to the temperature change. In one implementation of this embodiment, a second-interior cavity is formed in the second portion 13 of the third side 63. In another implementation of this embodiment, there is only a second-interior cavity on the second portion 13 of the third side 63 and no first-interior cavity 275 on the first portion 11 of the first side 61 of the RLG block 421.

Figure 12D:
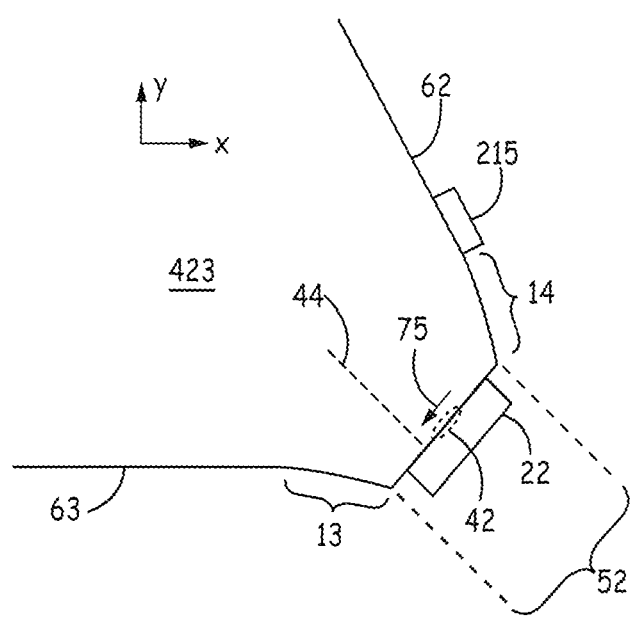
FIG. 12D shows an enlarged view of a second corner of an actively-configured RLG block, in which the second corner is actively shifted, in accordance with the present invention.

FIG. 12D shows an enlarged view of a second corner 52 of an actively-configured RLG block 423, in which the second corner 52 is actively shifted, in accordance with the present invention. In this embodiment the electrically-controlled element 215 that provides the active shifting is a Peltier element 215. As shown in FIG. 12D, a hot side of a Peltier element 215 is attached to the first portion 14 of the second side 62.

In one implementation of this embodiment, a second Peltier element is attached to the second portion 13 of the third side 63. In this case, a cool side of the second Peltier element is attached to the second portion 13 of the third side 63 of the RLG block 423. In this latter embodiment, the first Peltier element 215 and second Peltier element operate in opposing modes to laterally shift the second corner 52 as described above. In another implementation of this embodiment, the Peltier element 215 is attached to the RLG block 423 with a thermally conductive epoxy.

Figure 13:
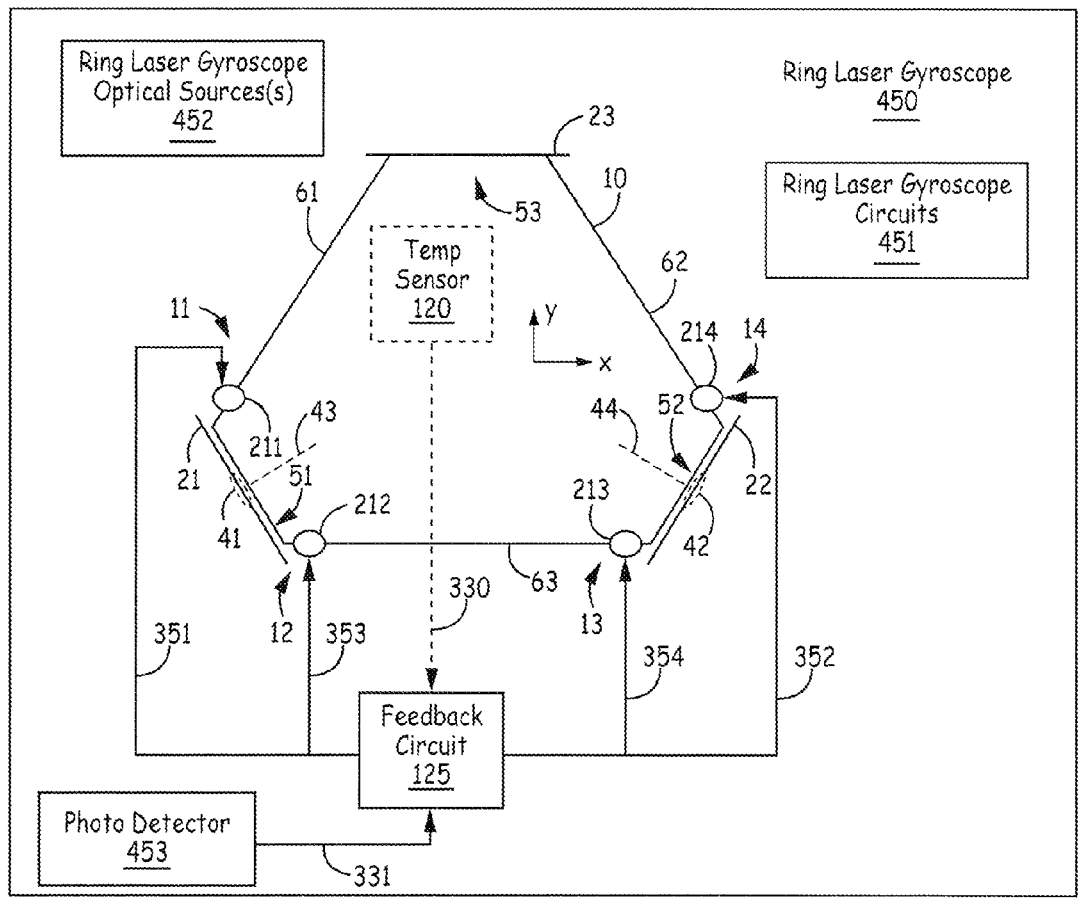
FIG. 13 shows an embodiment of a RLG in accordance with the present application.

FIG. 13 shows an embodiment of a RLG 450 in accordance with the present application. The RLG 450 includes a RLG block 10 having at least three corners 51-53 at least three mirrors 21-23 positioned at the respective at least three corners 51-53, at least one electrically-controlled element 211-214 attached to the RLG block 10, at least one optional temperature sensor 120, a feedback circuit 125, RLG circuits 451, at least one photodetector 453, and at least one RLG optical source 452. As known to one skilled in the art, the RLG circuits 451 are configured to prepare the optical signals from the RLG optical source 452 to be input to the RLG block 10 and to process signals output from the RLG block 10 to the at least one photodetector 453 to determine the rate of rotation of the RLG block 10. As known to one skilled in the art, the at least one RLG optical source 452 is configured to optically couple the CW optical beam and the CCW optical beam into the RLG block 10 and the at least one photodetector 453 is configured to input the optical signals output from the RLG block 10. The at least one photodetector 453 also provides signals to the feedback circuit 125 via link 331. When the temperature sensor 120 is implemented in the RLG 450, the temperature sensor 120 senses a temperature of the RLG block 10. The feedback circuit 125 is communicatively coupled to the temperature sensor 120 (via a wired or wireless link 330) to determine a temperature change of the RLG block 10 has exceed a preselected-temperature-change threshold (also referred to herein as a temperature threshold $T_{threshold}$). The temperature threshold $T_{threshold}$ is measured for both a temperature increase and a temperature decrease from an initial temperature to. Thus, the preselected-temperature-change threshold $T_{threshold}$ is exceeded when the temperature drops below ($T_0 - T_{threshold}$) and when the temperature exceeds ($T_0 + T_{threshold}$). In one implementation of this embodiment, there are a plurality of temperature thresholds that trigger increasing amounts of voltage/current from the feedback circuit 125 to be sent to the at least one electrically-controlled elements 211-214 attached to the RLG block 10. In one implementation of this embodiment, the initial temperature To is set during manufacturing of the RLG block 10. Temperature data is sent (continually or periodically) from the temperature sensor 120 to the feedback circuit 125 via link 330.

The feedback circuit 125 configured to: send a first electrical signal 351 to the at least one first electrically-controlled element 211 attached to the first portion 11 of the first side 61 of the RLG block 10; send a second electrical signal 352 to at least one second electrically-controlled element 214 attached to the first portion 14 of the second side 62; send a third electrical signal 353 to the at least one third electrically-controlled element 212 attached to the first portion 12 of the third side 63; and send a fourth electrical signal 354 to the at least one fourth electrically-controlled element 213 attached to the second portion 13 of the third side 63 RLG block 10.

In one implementation of this embodiment, the first second, third, and fourth electrically-controlled elements 211-214 are PZT elements 211-214. The first PZT element 211 is positioned in a first cavity in the first portion 11 of the first side 61 of the RLG block 10 and is configured to input the first voltage 351 from the feedback circuit 125. The second PZT element 211 is positioned in a second cavity in the first portion 14 of the second side 62 and is configured to input a second voltage 352 from the feedback circuit 125. The third PZT element 212 is positioned in a third cavity in the first portion 12 of the third side 63 and is configured to input a third voltage 353 from the feedback circuit 125. The fourth PZT element 213 is positioned in a second cavity in the second portion 13 of the third side 63 and is configured to input a fourth voltage 353 from the feedback circuit 125.

In another implementation of this embodiment, the first second, third, and fourth electrically-controlled element 211-214 are Peltier elements 211-214. The first Peltier element 211 is attached by the hot side to the first portion 11 of the first side 61 of the RLG block 10 is configured to input the first current 351 from the feedback circuit 125. The second Peltier element 214 is attached by the hot side to the first portion 14 of the second side 62 and is configured to input the second current 352 from the feedback circuit 125. The third Peltier element 212 is attached by a cool side to the first portion 12 of the third side 63 and is configured to input the third current 353 from the feedback circuit 125. The fourth Peltier element 213 is attached by a cool side to the second portion 13 of the third side 63 and is configured to input the fourth current 353 from the feedback circuit 125.

As described above, random drift improvement (RDI control) is used for the RLG 10 so that the first mirror 51 is configured to move inward/outward (parallel to the normal 43 of the first mirror 21) by a first amount Δd (FIG. 3) and the second mirror 52 is configured to simultaneously move outward/inward (parallel to the normal 44 of the second mirror 22) by the first amount Δd. The at least three mirrors 21-23 are arranged to support propagation of two counter propagating optical laser beams CCW and CW in the lasing plane X-Y of the RLG block 10. The RLG block 10 is configured to shift the first corner 21 laterally in the lasing plane X-Y in a first direction 71 or 73 (FIG. 6B or FIG. 7B) based on the temperature change; and shift the second corner 52 laterally in the lasing plane X-Y in a second direction 72 or 74 (FIG. 6B or FIG. 7B) based on the temperature change. A component (sin θ or sin γ) of the first direction 71 or 73 opposes a component (sin θ or sin γ) of the second direction 72 or 74, so that the first-incidence-spot 41 of the first mirror 21 and the second-incidence-spot 42 of the second mirror 22 are unchanged by the temperature change.

In one implementation of this embodiment, an embodiment of the passively-configured RLG blocks (e.g., RLG blocks 240-243 of FIGS. 12A-12C) are implemented in a RLG with RLG circuits 451, and at least one RLG optical source 453.

FIG. 14 shows a method 1400 to prevent lock-in due to temperature changes of RLG block in a RLG in accordance with the present application. The method 1400 is applicable to any of the embodiments of RLG blocks in the RLG in accordance with this application. At block 1402, the RLG block 10 is prepared so at least one of: the first corner of at least three corners of the RLG block 10 is operable to shift laterally in the lasing plane X-Y of the RLG block 10 and perpendicular to the first normal of the first mirror associated with the first corner; and the second corner of the at least three corners of the RLG block 10 is operable to shift laterally in the lasing plane X-Y and perpendicular to the second normal of the second mirror associated with the second corner. In this manner, when at least three respective mirrors 21-23, including the first mirror 21 and the second mirror 22, are arranged at the respective at least three corners 51-53 of the RLG block 10 to support counter-propagating optical laser beams CCW and CW in the lasing plane X-Y, and when the RLG block 10 one of thermally expands or thermally contracts due to a temperature change, then the first-incidence-spot 41 of the first mirror 21 is maintained during the one of a thermal expansion or a thermal contraction of the RLG block 10 and the second-incidence-spot 42 of the second mirror 22 is maintained during the one of the thermal expansion or the thermal contraction of the RLG block 10. When the first-incidence-spot 41 and the second-incidence-spot 42 are maintained the vector summation of counter-clockwise backscattered waves from the at least three mirrors remains constant during the temperature change. Likewise, the vector summation of clockwise backscattered waves from the at least three mirrors remains constant during the temperature change.

FIG. 15 shows a method 1500 to prevent lock-in due to temperature changes of an actively-configured RLG block in a RLG in accordance with the present application. The method 1500 is applicable to any of the embodiments of actively-configured RLG blocks in the RLG (e.g., RLG 450 as shown in FIG. 13) in accordance with this application, which require the feedback circuit 125 to control at least one electrically-controlled element.

At block 1502, at least one first electrically-controlled element 211 is attached on the first portion 11 of the first side 61 of the RLG block 10. In one implementation of this embodiment, at least one second electrically-controlled element 214 is attached on first portion 14 of the second side 62 of the RLG block 10. In yet another implementation of this embodiment, at least one third electrically-controlled element 212 is attached on the first portion 12 of the third side 63 of the RLG block 10. In yet another implementation of this embodiment, at least one fourth electrically-controlled element is attached on the second portion 13 of the third side 63 of the RLG block 10.

As described above, the electrically-controlled elements 211-214 can be a PZT element and/or a Peltier element.

In one implementation of this embodiment, a first cavity is formed in the first portion 11 of the first side 61 of the RLG block and a first PZT element 211 is inserted into the first cavity 250 and secured in the first cavity 250; a second cavity is formed in the first portion 14 of the second side 62 and the second PZT element 214 is inserted into the second cavity and secured in the second cavity; a third cavity 251 is formed in the first portion 12 of a third side 63 of the RLG block 10 and a third PZT element 212 is inserted into the third cavity 251 and secured in the third cavity 251; and a fourth cavity is formed in the second portion 13 of the third side 63 of the RLG block 10 and a fourth PZT element 213 is into the fourth cavity and secured in the fourth cavity.

In another implementation of this embodiment, a hot side of a first Peltier element 211 is attached on the first portion 11 of the first side 61 of the RLG block, a hot side of a second Peltier element 214 is attached on the first portion 14 of the second side 62, a cool side of at least one third Peltier element 212 is attached on the first portion 12 of the third side 63; a cool side of a fourth Peltier element 213 is attached on the second portion 13 of the third side 63 of the RLG block 10.

In yet implementation of this embodiment, a cool side of a first Peltier element 211 is attached on the first portion 11 of the first side 61 of the RLG block, a cool side of a second Peltier element 214 is attached on the first portion 14 of the second side 62, a hot side of at least one third Peltier element 212 is attached on the first portion 12 of the third side 63; a hot side of a fourth Peltier element 213 is attached on the second portion 13 of the third side 63 of the RLG block 10. Other configurations are possible as is understandable to one skilled in the art upon reading and understanding this document.

At block 1504, a feedback circuit 125 is arranged to apply a first electrical signal 351 to the at least one first electrically-controlled element 211 attached to the first portion 11 of the first side 61. For example, a wire is arranged to carry current or voltage from the feedback circuit 125 is attached to the first electrically-controlled element 211. In one implementation of this embodiment, the feedback circuit 125 is arranged to apply a second electrical signal 352 to at least one second electrically-controlled element 214 attached to the first portion 14 of the second side 62. In another implementation of this embodiment, the feedback circuit 125 is arranged to apply a third electrical signal 353 to the at least one third electrically-controlled element 212 attached to the first portion 12 of the third side 63. In yet another implementation of this embodiment, the feedback circuit 125 is arranged to apply a fourth electrical signal 354 to at least one fourth electrically-controlled element 213 attached to the second portion 13 of the third side 63.

Typically, if the electrically-controlled elements 211-214 are PZT elements 211-214, a voltage is applied to the PZT elements 211-214. Typically, if the electrically-controlled elements 211-214 are Peltier elements 211-214, a current is sent to the Peltier elements 211-214.

At block 1506, the feedback circuit 125 determines if a temperature change exceeds a preselected-temperature-change threshold $T_{threshold}$. When the temperature change exceeds the preselected-temperature-change threshold the performance of the RLG 12 is on the verge of being degraded. In one implementation of this embodiment, one or more processors in the feedback circuit 125 are implemented with a memory, in which the preselected-temperature-change threshold is stored, to execute software stored in a storage medium to make the determination based on temperature data input from the temperature sensor 120. In one implementation of this embodiment, temperature data is collected stored over time and the processor compares the recent temperature data with the previous temperature data to make the determination. In another implementation of this embodiment, the feedback circuit 125 includes a table for the required electrical signals for a given temperature of the RLG block 10. In this case, the table is based on a calibration that was done on the RLG block 10.

In yet another implementation of this embodiment, the feedback circuit 125 monitors the laser intensity fluctuations at the dither turn-around points and sends signals to adjust for minimum variation. In this embodiment, the preselected-temperature-change threshold $T_{threshold}$ is determined to be exceeded when the laser intensity fluctuations exceed a selected fluctuation level. The RDI control described above operates in this manner. However, the RDI control loop is fast responding and the block-shifting control is slow responding so the RDI control loop does not interfere with the lateral-shift control loop. Both are hunting for minimum backscatter indicated by reduced laser intensity fluctuations. In this embodiment, a temperature sensor 120 is not required and the feedback circuit receives input from the RLG circuits 451 as is understood by one skilled in the art.

At block 1508, the first electrical signal 351 is sent to the at least one first electrically-controlled element 211 responsive to the detected change in temperature. In another implementation of this embodiment, the third electrical signal 353 is sent to the at least one third electrically-controlled element 212 responsive to the detected change in temperature via a wire connected to the third electrically-controlled element 212.

As described above, when the determined temperature change causes an expansion of the RLG block 10, the first corner 21 shifts laterally, in the lasing plane X-Y, perpendicular to the first normal 43, and away from the second corner 42, responsive to sending the first electrical signal 351 and the third electrical signal 353. When the determined temperature change causes a contraction of the RLG block 10, the first corner 21 shifts laterally, in the lasing plane X-Y, perpendicular to the first normal 43, and toward the second corner 42, responsive to sending the first electrical signal 351 and the third electrical signal 353.

In another implementation of this embodiment, the second electrical signal 352 is sent to the at least one second electrically-controlled element 214 responsive to the detected change in temperature. In yet another implementation of this embodiment, the fourth electrical signal 354 is sent to the at least one fourth electrically-controlled element 213 responsive to the detected change in temperature. In this case, when the determined temperature change causes an expansion of the RLG block 10, the second corner 22 shifts laterally, in the lasing plane X-Y, perpendicular to the second normal 44 of the second mirror 22, and away from the first corner 21, responsive to sending the second electrical signal 352 and sending the fourth electrical signal 354. When the determined temperature change causes a contraction of the RLG block 10, the second corner 22 shifts laterally, in the lasing plane X-Y, perpendicular to the second normal 44 of the second mirror 22, and toward the first corner 21, responsive to sending the second electrical signal 352 and sending the fourth electrical signal 354.

It is to be understood that method 1500 is adjusted to accommodate the design of the RLG block and the number and location of the electrically-controlled elements.

The two PZT actuators working in a push-pull fashion for each corner of the RLG block where a transducer mirror is used. For increased control range, multiple PZT actuators can be mounted in parallel or the geometry of the RLG block could be changed to reduce glass stiffness. Unlike the method using PZT actuators that dynamically control and continually minimize backscatter, the passively-configured RLG blocks offer a way to adjust and minimize the backscatter during final testing, after the RLG block has been assembled. The passively-configured RLG block is not as effective as the PZT actively-configured RLG block. For example, the passively-configured RLG block may not adjust the RLG block over a temperature range of interest. However, the passively-configured RLG block is a cost effective alternative to the actively-configured RLG block.

The feedback circuit 125 includes at least one processing unit includes or functions with software programs, firmware or other computer readable instructions for carrying out various methods, process tasks, calculations, and control functions, used in the RLG as is understood by one skilled in the art.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Example Embodiments

Example 1 includes a ring laser gyroscope block, comprising: a first corner bordered by a first portion of a first side of the ring laser gyroscope block and a first portion of a third side of the ring laser gyroscope block; a second corner bordered by a first portion of a second side of the ring laser gyroscope block and a second portion of the third side of the ring laser gyroscope block; and a third corner bordered by a second portion of the second side and a second portion of the first side, wherein the first portion of the first side: shifts the first corner laterally in a lasing plane of the ring laser gyroscope block, in the direction toward the second corner, and perpendicular to a first normal of a first mirror associated with the first corner when a temperature change of the ring laser gyroscope block causes a contraction of the ring laser gyroscope block; and shifts the first corner laterally in the lasing plane, in the direction away from the second corner, and perpendicular to the first normal when the temperature change of the ring laser gyroscope block causes an expansion of the ring laser gyroscope block.

Example 2 includes the ring laser gyroscope block of Example 1, wherein the first portion of the second side: shifts the second corner laterally in the lasing plane, in the direction toward the first corner, and perpendicular to a second normal of a second mirror associated with the second corner when the temperature change of the ring laser gyroscope block causes a contraction of the ring laser gyroscope block; and shifts the second corner laterally in the lasing plane in the direction away from the first corner, and perpendicular to the second normal when the temperature change of the ring laser gyroscope block causes an expansion of the ring laser gyroscope block.

Example 3 includes the ring laser gyroscope block of Example 2, further comprising: a first electrically-controlled element on the first portion of the first side, wherein, when a first electrical signal is sent to the first electrically-controlled element, the first corner is shifted laterally based on the first electrical signal and the temperature change; and a second electrically-controlled element on the first portion of the second side, wherein, when a second electrical signal is sent to the first electrically-controlled element, the second corner is shifted laterally based on the second electrical signal and the temperature change.

Example 4 includes the ring laser gyroscope block of any of Examples 1-3, further comprising: a first electrically-controlled element on the first portion of the first side; and at least one temperature sensor to sense a temperature of the ring laser gyroscope block, wherein, when a feedback circuit communicatively coupled to the temperature sensor determines the temperature change of the ring laser gyroscope block has exceed a preselected-temperature-change threshold, a first electrical signal is generated at the feedback circuit and sent to the first electrically-controlled element, wherein the first corner is shifted laterally responsive to the first electrical signal.

Example 5 includes a method to prevent lock-in due to temperature changes of a ring laser gyroscope block in a ring laser gyroscope, the method comprising: preparing the ring laser gyroscope block so at least one of: a first corner of at least three corners of the ring laser gyroscope block is operable to shift laterally in a lasing plane of the ring laser gyroscope block and perpendicular to a first normal of a first mirror associated with the first corner; and a second corner of the at least three corners of the ring laser gyroscope block is operable to shift laterally in the lasing plane and perpendicular to a second normal of a second mirror associated with the second corner, wherein, when at least three respective mirrors, including the first mirror and the second mirror, are arranged at the at least three corners of the ring laser gyroscope block to support counter-propagating optical laser beams in the lasing plane, and when the ring laser gyroscope block one of thermally expands or thermally contracts due to a temperature change, then: a first-incidence-spot of a first mirror is maintained during one of a thermal expansion or a thermal contraction of the ring laser gyroscope block; and a second-incidence-spot of a second mirror is maintained during the one of the thermal expansion or the thermal contraction of the ring laser gyroscope block, wherein a vector summation of counter-clockwise backscattered waves from the at least three mirrors remains constant during the temperature change.

Example 6 includes the method of Example 5, wherein preparing the ring laser gyroscope block comprises: attaching at least one first electrically-controlled element on a first portion of a first side of the ring laser gyroscope block.

Example 7 includes the method of Example 6, wherein preparing the ring laser gyroscope block further comprises: attaching at least one second electrically-controlled element on a first portion of a second side of the ring laser gyroscope block.

Example 8 includes the method of Example 7, wherein preparing the ring laser gyroscope block further comprises: attaching at least one third electrically-controlled element on a first portion of a third side of the ring laser gyroscope block; and attaching at least one fourth electrically-controlled element on a second portion of the third side of the ring laser gyroscope block.

Example 9 includes the method of Example 8, further comprising: arranging a feedback circuit to apply a first electrical signal to the at least one first electrically-controlled element attached to the first portion of the first side; arranging the feedback circuit to apply a second electrical signal to the at least one second electrically-controlled element attached to the first portion of the second side; arranging the feedback circuit to apply a third electrical signal to the at least one third electrically-controlled element attached to the first portion of the third side; arranging the feedback circuit to apply a fourth electrical signal to the at least one fourth electrically-controlled element attached to the second portion of the third side; determining the temperature change exceeds a preselected-temperature-change threshold; sending the first electrical signal to the at least one first electrically-controlled element responsive to the detected change in temperature; sending the third electrical signal to the at least one third electrically-controlled element responsive to the detected change in temperature, wherein, when the determined temperature change causes an expansion of the ring laser gyroscope block, the first corner shifts laterally, in the lasing plane, perpendicular to the first normal, and away from the second corner, responsive to sending the first electrical signal and the third electrical signal, and wherein, when the determined temperature change causes a contraction of the ring laser gyroscope block, the first corner shifts laterally, in the lasing plane, perpendicular to the first normal, and toward the second corner, responsive to sending the first electrical signal and the third electrical signal; and sending the second electrical signal to the at least one second electrically-controlled element responsive to the detected change in temperature; sending the fourth electrical signal to the at least one fourth electrically-controlled element responsive to the detected change in temperature, wherein, when the determined temperature change causes the expansion of the ring laser gyroscope block, the second corner shifts laterally, in the lasing plane, perpendicular to the second normal, and away from the first corner, responsive to sending the second electrical signal and sending the fourth electrical signal, and when the determined temperature change causes the contraction of the ring laser gyroscope block, the second corner shifts laterally, in the lasing plane, perpendicular to the second normal, and toward the first corner, responsive to sending the second electrical signal and sending the fourth electrical signal.

Example 10 includes the method of any of Examples 7-9, further comprising: arranging a feedback circuit to apply a first electrical signal to the at least one first electrically-controlled element attached to the first portion of the first side; arranging the feedback circuit to apply a second electrical signal to the at least one second electrically-controlled element attached to the first portion of the second side; determining the temperature change exceeds a preselected-temperature-change threshold; sending the first electrical signal to the at least one first electrically-controlled element responsive to the detected change in temperature, wherein, when the determined temperature change causes an expansion of the ring laser gyroscope block, the first corner shifts laterally, in the lasing plane, perpendicular to the first normal, and away from the second corner, responsive to sending the first electrical signal, and wherein, when the determined temperature change causes a contraction of the ring laser gyroscope block, the first corner shifts laterally, in the lasing plane, perpendicular to the first normal, and toward the second corner, responsive to sending the first electrical signal; sending the second electrical signal to the at least one second electrically-controlled element responsive to the detected change in temperature, wherein, when the determined temperature change causes the expansion of the ring laser gyroscope block, the second corner shifts laterally, in the lasing plane, perpendicular to the second normal, and away from the first corner, responsive to sending the second electrical signal, and wherein, when the determined temperature change causes the contraction of the ring laser gyroscope block, the second corner shifts laterally, in the lasing plane, perpendicular to the second normal, and toward the first corner, responsive to sending the second electrical signal.

Example 11 includes the method of any of Examples 6-10, further comprising: arranging a feedback circuit to apply a first electrical signal to the at least one first electrically-controlled element attached to the first portion 11 of the first side 61; determining the temperature change exceeds a preselected-temperature-change threshold; sending the first electrical signal to the at least one first electrically-controlled element responsive to the detected change in temperature, wherein, when the determined temperature change causes an expansion of the ring laser gyroscope block, the first corner shifts laterally, in the lasing plane, perpendicular to the first normal, and away from the second corner, responsive to sending the first electrical signal, and wherein, when the determined temperature change causes a contraction of the ring laser gyroscope block, the first corner shifts laterally, in the lasing plane, perpendicular to first the normal, and toward the second corner, responsive to sending the first electrical signal.

Example 12 includes the method of any of Examples 5-11, wherein preparing the ring laser gyroscope block comprises: forming micro-fractures on a first portion of a first side of the ring laser gyroscope block, wherein the micro-fractures cause the first corner to shift laterally in the lasing plane of the ring laser gyroscope block, and perpendicular to the first normal.

Example 13 includes the method of Example 12, wherein preparing the ring laser gyroscope block further comprises: forming micro-fractures on a first portion of a second side of the ring laser gyroscope block, wherein the micro-fractures cause the second corner to shift laterally in the lasing plane, and perpendicular to the second normal when the ring laser gyroscope block one of thermally expands or thermally contracts due to the temperature change.

Example 14 includes the method of any of Examples 5-13, wherein preparing the ring laser gyroscope block comprises: forming at least one first cavity in a first portion of a first side of the ring laser gyroscope block, wherein the at least one first cavity causes the first corner to shift laterally in the lasing plane of the ring laser gyroscope block, and perpendicular to the first normal when the ring laser gyroscope block one of thermally expands or thermally contracts due to the temperature change; and forming at least one second cavity at a first portion of a second side of the ring laser gyroscope block, wherein the at least one second cavity causes the second corner to shift laterally in the lasing plane, and perpendicular to the second normal when the ring laser gyroscope block one of thermally expands or thermally contracts due to the temperature change.

Example 15 includes a ring laser gyroscope, comprising: at least one ring laser gyroscope optical source; ring laser gyroscope circuits configured to process at least one optical beam output from a ring laser gyroscope block to determine a rate of rotation of the ring laser gyroscope; the ring laser gyroscope block having at least three corners the ring laser gyroscope block configured to input at least one optical beam from the at least one ring laser gyroscope optical source; and at least three mirrors positioned at the respective at least three corners, wherein a first mirror is configured to move inward in the direction of a first normal of the first mirror by a first amount while a second mirror is configured to simultaneously move outward in the direction of a second normal of the second mirror by the first amount, wherein the at least three mirrors are arranged to support propagation of two counter-propagating optical laser beams in a lasing plane of the ring laser gyroscope block, and wherein the ring laser gyroscope block at least one of: shifts a first corner laterally in the lasing plane in a direction perpendicular to the first normal of a first mirror based on the temperature change; and shifts a second corner laterally in the lasing plane in a direction perpendicular to the second normal of a second mirror based on the temperature change, so that a first-incidence-spot of the first mirror and a second-incidence-spot of the second mirror are unchanged by the temperature change.

Example 16 includes the ring laser gyroscope of Example 15, further comprising: at least one first electrically-controlled element on a first portion of a first side of the ring laser gyroscope block; at least one temperature sensor to sense a temperature of the ring laser gyroscope block; and a feedback circuit configured to apply a first electrical signal to the at least one first electrically-controlled element attached to the first portion of the first side of the ring laser gyroscope block based on a determination that the temperature change of the ring laser gyroscope block has exceeded the preselected-temperature-change threshold.

Example 17 includes the ring laser gyroscope of Example 16, further comprising: at least one second electrically-controlled element on first portion of a second side of the ring laser gyroscope block.

Example 18 includes the ring laser gyroscope of any of Examples 15-17, further comprising: wherein the feedback circuit is further configured to apply a second electrical signal to at least one second electrically-controlled element attached to the first portion of the second side based on the determination that the temperature change of the ring laser gyroscope block has exceeded the preselected-temperature-change threshold.

Example 19 includes the ring laser gyroscope of Example 18, further comprising: at least one third electrically-controlled element on first portion of a third side of the ring laser gyroscope block, wherein the feedback circuit is further configured to apply a third electrical signal to at least one third electrically-controlled element attached to the first portion of the third side based on the determination that the temperature change of the ring laser gyroscope block has exceeded the preselected-temperature-change threshold.

Example 20 includes the ring laser gyroscope of any of Examples 17-19, further comprising: at least one fourth electrically-controlled element attached to the second portion of the third side of the ring laser gyroscope block, wherein the feedback circuit is further configured to apply a fourth electrical signal to at least one fourth electrically-controlled element attached to the second portion of the third side of the ring laser gyroscope block based on the determination that the temperature change of the ring laser gyroscope block has exceeded the preselected-temperature-change threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A ring laser gyroscope block, comprising:
   a first corner bordered by a first portion of a first side of the ring laser gyroscope block and a first portion of a third side of the ring laser gyroscope block;
   a second corner bordered by a first portion of a second side of the ring laser gyroscope block and a second portion of the third side of the ring laser gyroscope block; and
   a third corner bordered by a second portion of the second side and a second portion of the first side,
   wherein the first portion of the first side includes a first shifting element configured to:
   shift the first corner laterally in a lasing plane of the ring laser gyroscope block, in the direction toward the second corner, and perpendicular to a first normal of a reflective surface of a first mirror associated with the first corner when a temperature change of the ring laser gyroscope block causes a contraction of the ring laser gyroscope block; and
   shift the first corner laterally in the lasing plane, in the direction away from the second corner, and perpendicular to the first normal of the reflective surface of the first mirror when the temperature change of the ring laser gyroscope block causes an expansion of the ring laser gyroscope block.

2. The ring laser gyroscope block of claim 1, wherein the first portion of the second side includes a second shifting element configured to:
   shift the second corner laterally in the lasing plane, in the direction toward the first corner, and perpendicular to a second normal of a reflective surface of a second mirror associated with the second corner when the temperature change of the ring laser gyroscope block causes a contraction of the ring laser gyroscope block; and
   shift the second corner laterally in the lasing plane in the direction away from the first corner, and perpendicular to the second normal of the reflective surface of the second mirror when the temperature change of the ring laser gyroscope block causes an expansion of the ring laser gyroscope block.

3. The ring laser gyroscope block of claim 2,
wherein the first shifting element includes a first electrically-controlled element on the first portion of the first side, wherein, when a first electrical signal is sent to the first electrically-controlled element, the first corner is shifted laterally based on the first electrical signal and the temperature change; and
wherein the second shifting element includes a second electrically-controlled element on the first portion of the second side, wherein, when a second electrical signal is sent to the first electrically-controlled element, the second corner is shifted laterally based on the second electrical signal and the temperature change.

4. The ring laser gyroscope block of claim 1, further comprising:
at least one temperature sensor to sense a temperature of the ring laser gyroscope block,
wherein the first shifting element includes a first electrically-controlled element on the first portion of the first side;
wherein, when a feedback circuit communicatively coupled to the temperature sensor determines the temperature change of the ring laser gyroscope block has exceed a preselected-temperature-change threshold, a first electrical signal is generated at the feedback circuit and sent to the first electrically-controlled element, wherein the first corner is shifted laterally responsive to the first electrical signal.

5. A method to prevent lock-in due to temperature changes of a ring laser gyroscope block in a ring laser gyroscope, the method comprising:
preparing the ring laser gyroscope block so at least one of:
a first shifting element is operable to shift a first corner of at least three corners of the ring laser gyroscope block laterally in a lasing plane of the ring laser gyroscope block and perpendicular to a first normal of a reflective surface of a first mirror associated with the first corner; and
a second shifting element is operable to shift a second corner of the at least three corners of the ring laser gyroscope block laterally in the lasing plane and perpendicular to a second normal of a reflective surface of a second mirror associated with the second corner,
wherein, when at least three respective mirrors, including the first mirror and the second mirror, are arranged at the at least three corners of the ring laser gyroscope block to support counter-propagating optical laser beams in the lasing plane, and when the ring laser gyroscope block one of thermally expands or thermally contracts due to a temperature change, then:
a first-incidence-spot of a first mirror is maintained during one of a thermal expansion or a thermal contraction of the ring laser gyroscope block; and
a second-incidence-spot of a second mirror is maintained during the one of the thermal expansion or the thermal contraction of the ring laser gyroscope block, wherein a vector summation of counter-clockwise backscattered waves from the at least three mirrors remains constant during the temperature change.

6. The method of claim 5, wherein
the first shifting element includes at least one first electrically-controlled element on a first portion of a first side of the ring laser gyroscope block.

7. The method of claim 6, wherein
the second shifting element includes at least one second electrically-controlled element on a first portion of a second side of the ring laser gyroscope block.

8. The method of claim 7, further comprising preparing the ring laser gyroscope block so that:
at least one third electrically-controlled element on a first portion of a third side of the ring laser gyroscope block is operable to shift the first corner of at least three corners of the ring laser gyroscope block laterally in the lasing plane of the ring laser gyroscope block and perpendicular to the first normal of the reflective surface of the first mirror associated with the first corner; and
at least one fourth electrically-controlled element on a second portion of the third side of the ring laser gyroscope block is operable to shift the second corner of the at least three corners of the ring laser gyroscope block laterally in the lasing plane and perpendicular to the reflective surface of the second normal of the second mirror associated with the second corner.

9. The method of claim 8, further comprising:
arranging a feedback circuit to apply a first electrical signal to the at least one first electrically-controlled element attached to the first portion of the first side;
arranging the feedback circuit to apply a second electrical signal to the at least one second electrically-controlled element attached to the first portion of the second side;
arranging the feedback circuit to apply a third electrical signal to the at least one third electrically-controlled element attached to the first portion of the third side;
arranging the feedback circuit to apply a fourth electrical signal to the at least one fourth electrically-controlled element attached to the second portion of the third side;
determining the temperature change exceeds a preselected-temperature-change threshold;
sending the first electrical signal to the at least one first electrically-controlled element responsive to the detected change in temperature;
sending the third electrical signal to the at least one third electrically-controlled element responsive to the detected change in temperature,
wherein, when the determined temperature change causes an expansion of the ring laser gyroscope block, the first corner shifts laterally, in the lasing plane, perpendicular to the first normal of the reflective surface of the second mirror, and away from the second corner, responsive to sending the first electrical signal and the third electrical signal, and
wherein, when the determined temperature change causes a contraction of the ring laser gyroscope block, the first corner shifts laterally, in the lasing plane, perpendicular to the first normal of the reflective surface of the second mirror, and toward the second corner, responsive to sending the first electrical signal and the third electrical signal; and
sending the second electrical signal to the at least one second electrically-controlled element responsive to the detected change in temperature;
sending the fourth electrical signal to the at least one fourth electrically-controlled element responsive to the detected change in temperature,
wherein, when the determined temperature change causes the expansion of the ring laser gyroscope block, the second corner shifts laterally, in the lasing plane, perpendicular to the second normal of the reflective surface of the second mirror, and away from the first corner, responsive to sending the second electrical signal and sending the fourth electrical signal, and when the determined temperature change causes the contraction of the ring laser gyroscope block, the second corner shifts laterally, in the lasing plane, perpendicular to the second normal of the reflective surface of the second mirror, and toward the first corner, responsive to sending the second electrical signal and sending the fourth electrical signal.

10. The method of claim 7, further comprising:

arranging a feedback circuit to apply a first electrical signal to the at least one first electrically-controlled element attached to the first portion of the first side;

arranging the feedback circuit to apply a second electrical signal to the at least one second electrically-controlled element attached to the first portion of the second side;

determining the temperature change exceeds a preselected-temperature-change threshold;

sending the first electrical signal to the at least one first electrically-controlled element responsive to the detected change in temperature, wherein, when the determined temperature change causes an expansion of the ring laser gyroscope block, the first corner shifts laterally, in the lasing plane, perpendicular to the first normal of the reflective surface of the first mirror, and away from the second corner, responsive to sending the first electrical signal, and wherein, when the determined temperature change causes a contraction of the ring laser gyroscope block, the first corner shifts laterally, in the lasing plane, perpendicular to the first normal of the reflective surface of the first mirror, and toward the second corner, responsive to sending the first electrical signal;

sending the second electrical signal to the at least one second electrically-controlled element responsive to the detected change in temperature, wherein, when the determined temperature change causes the expansion of the ring laser gyroscope block, the second corner shifts laterally, in the lasing plane, perpendicular to the second normal of the reflective surface of the second mirror, and away from the first corner, responsive to sending the second electrical signal, and wherein, when the determined temperature change causes the contraction of the ring laser gyroscope block, the second corner shifts laterally, in the lasing plane, perpendicular to the second normal of the reflective surface of the second mirror, and toward the first corner, responsive to sending the second electrical signal.

11. The method of claim 6, further comprising:

arranging a feedback circuit to apply a first electrical signal to the at least one first electrically-controlled element attached to the first portion of the first side;

determining the temperature change exceeds a preselected-temperature-change threshold;

sending the first electrical signal to the at least one first electrically-controlled element responsive to the detected change in temperature, wherein, when the determined temperature change causes an expansion of the ring laser gyroscope block, the first corner shifts laterally, in the lasing plane, perpendicular to the first normal of the reflective surface of the first mirror, and away from the second corner, responsive to sending the first electrical signal, and wherein, when the determined temperature change causes a contraction of the ring laser gyroscope block, the first corner shifts laterally, in the lasing plane, perpendicular to first the normal of the reflective surface of the second mirror, and toward the second corner, responsive to sending the first electrical signal.

12. The method of claim 5, wherein the first shifting element includes micro-fractures on a first portion of a first side of the ring laser gyroscope block, wherein the micro-fractures cause the first corner to shift laterally in the lasing plane of the ring laser gyroscope block, and perpendicular to the first normal of the reflective surface of the first mirror.

13. The method of claim 12, wherein the second shifting element includes micro-fractures on a first portion of a second side of the ring laser gyroscope block, wherein the micro-fractures cause the second corner to shift laterally in the lasing plane, and perpendicular to the second normal of the reflective surface of the second mirror when the ring laser gyroscope block one of thermally expands or thermally contracts due to the temperature change.

14. The method of claim 5, wherein the first shifting element includes at least one first cavity in a first portion of a first side of the ring laser gyroscope block, wherein the at least one first cavity causes the first corner to shift laterally in the lasing plane of the ring laser gyroscope block, and perpendicular to the first normal of the reflective surface of the first mirror when the ring laser gyroscope block one of thermally expands or thermally contracts due to the temperature change; and wherein the second shifting element includes at least one second cavity at a first portion of a second side of the ring laser gyroscope block, wherein the at least one second cavity causes the second corner to shift laterally in the lasing plane, and perpendicular to the second normal of the reflective surface of the second mirror when the ring laser gyroscope block one of thermally expands or thermally contracts due to the temperature change.

15. A ring laser gyroscope, comprising:

at least one ring laser gyroscope optical source;

ring laser gyroscope circuits configured to process at least one optical beam output from a ring laser gyroscope block to determine a rate of rotation of the ring laser gyroscope;

the ring laser gyroscope block having at least three corners the ring laser gyroscope block configured to input at least one optical beam from the at least one ring laser gyroscope optical source; and at least three mirrors positioned at the respective at least three corners, wherein a first mirror is configured to move inward in the direction of a first normal of a reflective surface of the first mirror by a first amount while a second mirror is configured to simultaneously move outward in the direction of a second normal of a reflective surface of the second mirror by the first amount, wherein the at least three mirrors are arranged to support propagation of two counter-propagating optical laser beams in a lasing plane of the ring laser gyroscope block, and wherein the ring laser gyroscope block includes at least one of:
- a first shifting element configured to shift a first corner laterally in the lasing plane in a direction perpendicular to the first normal of the reflective surface of the first mirror based on the temperature change; and
- a second shifting element configured to shift a second corner laterally in the lasing plane in a direction perpendicular to the second normal of the reflective surface of the second mirror based on the temperature change, wherein a first-incidence-spot of the first mirror and a second-incidence-spot of the second mirror are unchanged by the temperature change.

16. The ring laser gyroscope of claim 15, wherein the first shifting element includes at least one first electrically-controlled element attached to a first portion of a first side of the ring laser gyroscope block, the ring laser gyroscope further comprising:
- at least one temperature sensor to sense a temperature of the ring laser gyroscope block; and
- a feedback circuit configured to apply a first electrical signal to the at least one first electrically-controlled element attached to the first portion of the first side of the ring laser gyroscope block based on a determination that the temperature change of the ring laser gyroscope block has exceeded the preselected-temperature-change threshold.

17. The ring laser gyroscope of claim 16, wherein the second shifting element includes at least one second electrically-controlled element attached to a first portion of a second side of the ring laser gyroscope block.

18. The ring laser gyroscope of claim 17, further comprising:
- wherein the feedback circuit is further configured to apply a second electrical signal to the at least one second electrically-controlled element attached to the first portion of the second side based on the determination that the temperature change of the ring laser gyroscope block has exceeded the preselected-temperature-change threshold.

19. The ring laser gyroscope of claim 18, further comprising:
- at least one third electrically-controlled element attached to a first portion of a third side of the ring laser gyroscope block, wherein the feedback circuit is further configured to apply a third electrical signal to at least one third electrically-controlled element attached to the first portion of the third side based on the determination that the temperature change of the ring laser gyroscope block has exceeded the preselected-temperature-change threshold.

20. The ring laser gyroscope of claim 18, further comprising:
- at least one fourth electrically-controlled element attached to a second portion of the third side of the ring laser gyroscope block, wherein the feedback circuit is further configured to apply a fourth electrical signal to the at least one fourth electrically-controlled element attached to the second portion of the third side of the ring laser gyroscope block based on the determination that the temperature change of the ring laser gyroscope block has exceeded the preselected-temperature-change threshold.

* * * * *